United States Patent
Mima et al.

(10) Patent No.: US 10,194,125 B2
(45) Date of Patent: Jan. 29, 2019

(54) PROJECTION APPARATUS

(71) Applicant: Panasonic Intellectual Property Management Co., Ltd., Osaka (JP)

(72) Inventors: Kunihiro Mima, Kyoto (JP); Satoshi Kamiya, Saitama (JP); Keigo Ono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/186,471

(22) Filed: Jun. 18, 2016

(65) Prior Publication Data

US 2016/0295185 A1 Oct. 6, 2016

Related U.S. Application Data

(63) Continuation of application No. PCT/JP2015/004333, filed on Aug. 28, 2015.

(30) Foreign Application Priority Data

Sep. 25, 2014 (JP) .................................. 2014-195432
Mar. 12, 2015 (JP) .................................. 2015-050019

(51) Int. Cl.
*H04N 9/31* (2006.01)
*G09G 5/36* (2006.01)
(Continued)

(52) U.S. Cl.
CPC ......... *H04N 9/3185* (2013.01); *G03B 21/142* (2013.01); *G06F 3/017* (2013.01);
(Continued)

(58) Field of Classification Search
CPC ........ G09G 5/36; G06F 3/017; H04N 9/3185; H04N 9/3194; H04N 9/3179; H04N 9/3188; G03B 21/142
See application file for complete search history.

(56) References Cited

U.S. PATENT DOCUMENTS

| 8,717,501 B2 | 5/2014 | Furukawa |
| 2007/0013875 A1* | 1/2007 | Matsuoka ............ G03B 21/142 353/70 |

(Continued)

FOREIGN PATENT DOCUMENTS

| JP | 2005-043570 | 2/2005 |
| JP | 2005-157135 | 6/2005 |

(Continued)

OTHER PUBLICATIONS

International Search Report of PCT application No. PCT/JP2015/004333 dated Nov. 24, 2015.

*Primary Examiner* — Michael E Teitelbaum
*Assistant Examiner* — Sean N. Haiem
(74) *Attorney, Agent, or Firm* — Wenderoth, Lind & Ponack, L.L.P.

(57) ABSTRACT

A projector apparatus includes a projection unit and a controller. The projection unit projects projection video of an image at a set angle of view on a projection surface in accordance with a video signal indicating the angle of view of the image including an object. The controller performs video signal processing for changing a position or size of the object in the image and controls the position or size of the projection video on the projection surface. In a case where the position or size of the object is to be changed by the video signal processing, when a resolution of the projection video of the changed object is less than a predetermined value, the controller controls the projection unit to decrease the angle of view so that the resolution of the projection (Continued)

video is equal to or greater than the predetermined value, and the controller sets the size of the object in the image by the video signal processing.

15 Claims, 18 Drawing Sheets

(51) Int. Cl.
    *G06F 3/01* (2006.01)
    *G03B 21/14* (2006.01)
(52) U.S. Cl.
    CPC ............ *G09G 5/36* (2013.01); *H04N 9/3179* (2013.01); *H04N 9/3188* (2013.01); *H04N 9/3194* (2013.01)

(56) References Cited

U.S. PATENT DOCUMENTS

| | | | | |
|---|---|---|---|---|
| 2010/0118184 | A1* | 5/2010 | Yokoyama | G09G 5/00 348/441 |
| 2010/0130259 | A1 | 5/2010 | Lee | |
| 2011/0080478 | A1* | 4/2011 | Kohno | G06F 3/147 348/143 |
| 2011/0205497 | A1* | 8/2011 | Wakabayashi | G02B 26/101 353/28 |
| 2012/0069177 | A1* | 3/2012 | Nagano | G06T 3/40 348/135 |
| 2012/0133837 | A1* | 5/2012 | Furukawa | H04N 21/41415 348/607 |
| 2012/0147341 | A1* | 6/2012 | Tsukagoshi | G03B 21/142 353/101 |
| 2012/0214546 | A1* | 8/2012 | Osaka | H04M 1/0272 455/556.1 |
| 2013/0120715 | A1* | 5/2013 | Ueda | A63C 19/065 353/30 |
| 2013/0328764 | A1* | 12/2013 | Chon | G06F 3/01 345/156 |
| 2015/0009218 | A1 | 1/2015 | Fukutomi et al. | |
| 2015/0015852 | A1* | 1/2015 | Furui | H04N 9/3194 353/69 |

FOREIGN PATENT DOCUMENTS

| | | |
|---|---|---|
| JP | 2007-178534 | 7/2007 |
| JP | 2010-118863 | 5/2010 |
| JP | 2010-153983 | 7/2010 |
| JP | 2012-123282 | 6/2012 |
| JP | 2013-213877 | 10/2013 |
| JP | 2014-178504 | 9/2014 |

* cited by examiner

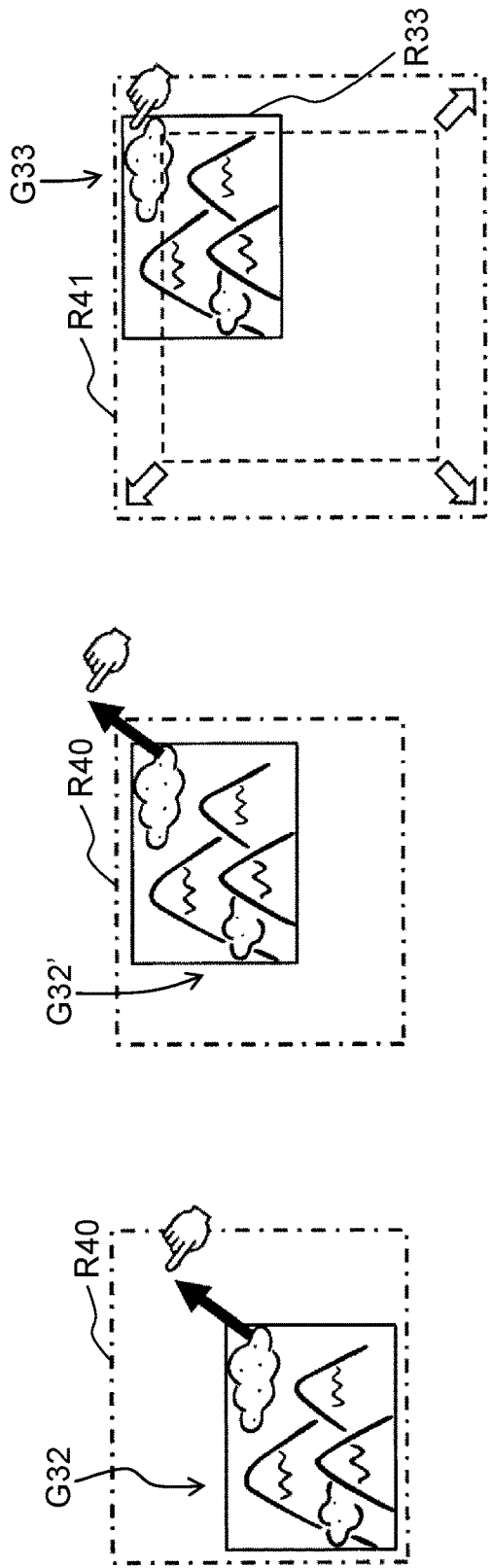

PROJECTION APPARATUS

BACKGROUND

1. Technical Field

The present disclosure relates to a projection apparatus for projecting video.

2. Description of the Related Art

Unexamined Japanese Patent Publication No. 2005-157135 discloses an output device that performs video output with a projector and the like. The output device disclosed in Unexamined Japanese Patent Publication No. 2005-157135 stores, in a storage unit, an area of a virtual screen allocated from an output control device and a display area of a projector apparatus. Furthermore, the output device acquires a screen state control instruction from a screen state control device to update a screen state, and sets the virtual screen based on a screen update instruction to acquire content. The output device then draws and displays only a set display area within the virtual screen by an instruction from the output control device. The output device of Unexamined Japanese Patent Publication No. 2005-157135 controls an output position and size of projection video in accordance with behavior of an individual or a group, even when there are many people in public spaces.

SUMMARY

The present disclosure provides a projection apparatus that can secure image quality of projection video even if size of the projection video is changed.

The projection apparatus according to the present disclosure includes a projection unit and a controller. The projection unit projects projection video of an image at a set angle of view on a predetermined projection surface in accordance with a video signal that indicates a predetermined object. The controller performs video signal processing for changing a position or size of the object in the image, and controls the position or size of the projection video of the object on the projection surface. In a case where the position or size of the object in the image is to be changed by the video signal processing, when a resolution of the projection video of the changed object is less than a predetermined value, the controller controls the projection unit to decrease the angle of view so that the resolution of the projection video of the object is equal to or greater than the predetermined value, and the controller sets the size of the object in the image by the video signal processing.

The projection apparatus according to the present disclosure can secure image quality of the projection video even if the size of the projection video is changed.

BRIEF DESCRIPTION OF THE DRAWINGS

FIG. 14A is a diagram illustrating a display example of the projection operation in response to a moving operation of the projecting position;

FIG. 14B is a diagram illustrating a display example of the projection operation in response to the moving operation of the projecting position, subsequent to FIG. 14A;

FIG. 14C is a diagram illustrating a display example of the projection operation in response to the moving operation of the projecting position, subsequent to FIG. 14B;

DETAILED DESCRIPTION

Exemplary embodiments will be described in detail below with reference to the drawings as needed. However, a description more detailed than necessary may be omitted. For example, a detailed description of already well-known items and a repeated description regarding substantially identical components may be omitted. This is intended to avoid making the following description unnecessarily redundant and to make it easier for a person skilled in the art to understand the exemplary embodiments.

It is to be noted that the applicant provides the accompanying drawings and the following description in order for a person skilled in the art to fully understand the present disclosure, and that the applicant does not intend to limit the subject described in the appended claims.

First Exemplary Embodiment

Figure 1:
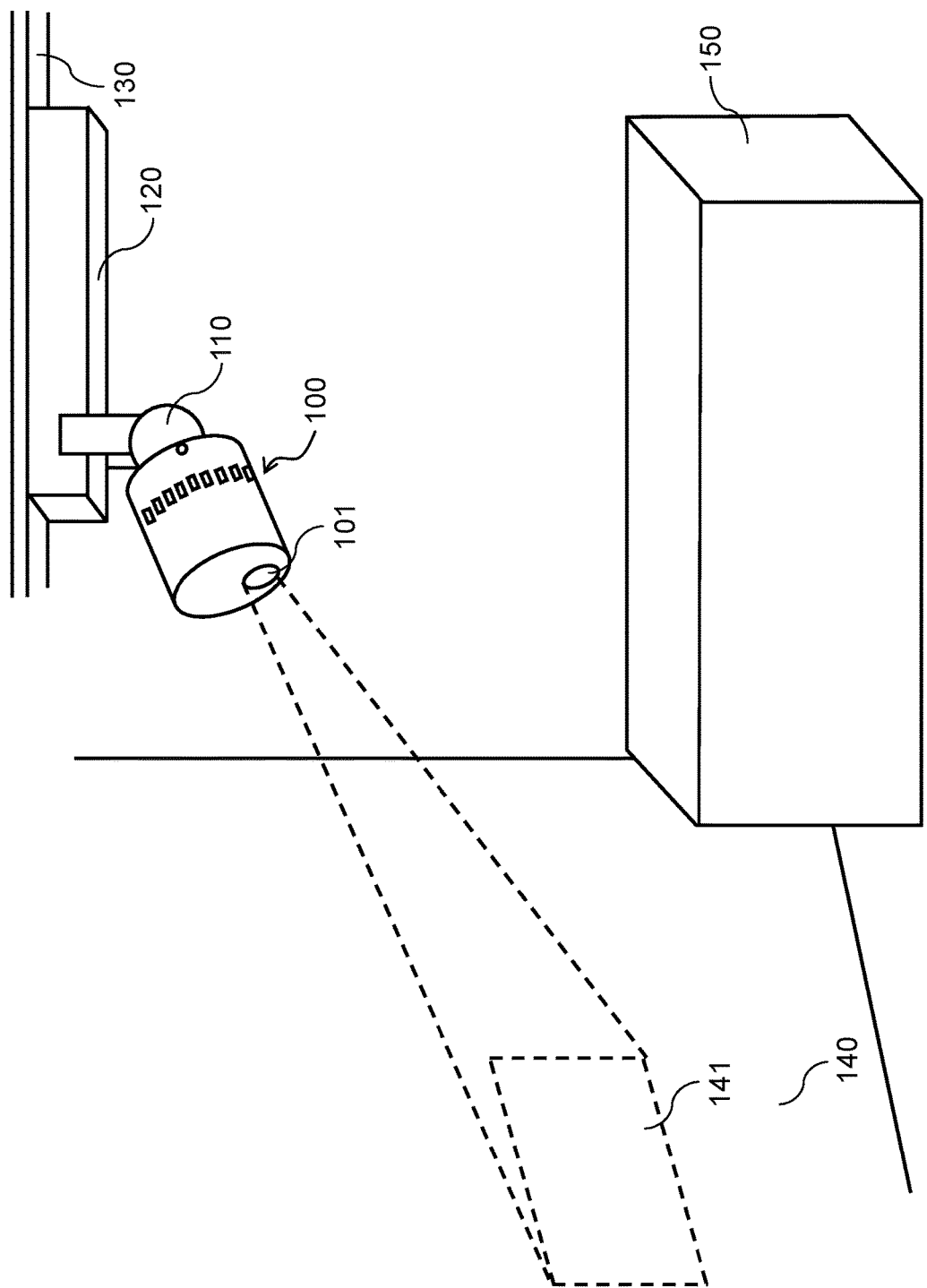
FIG. 1 is a diagram illustrating a state in which a projector apparatus according to a first exemplary embodiment projects video on a wall.
Figure 2:
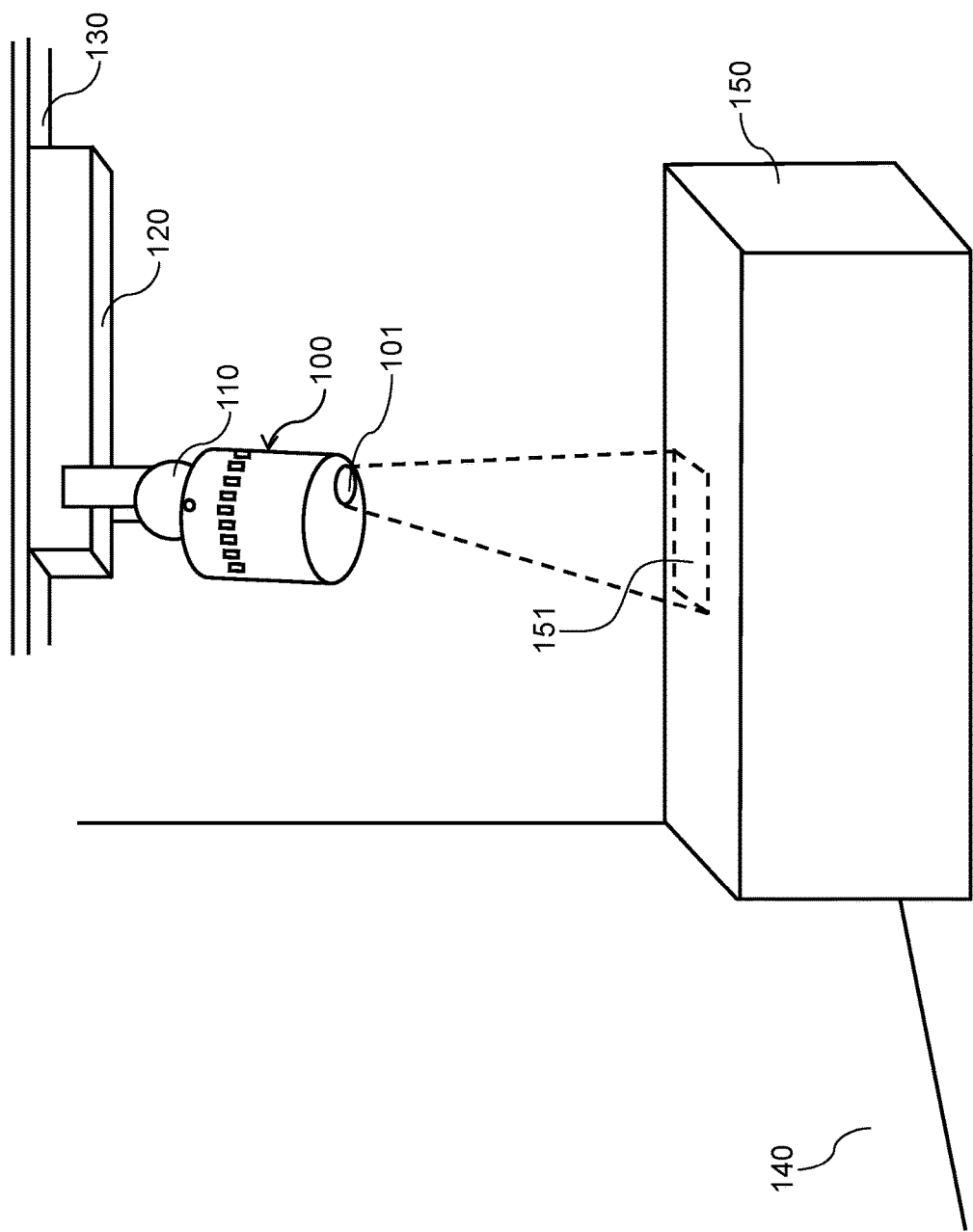
FIG. 2 is a diagram illustrating a state in which the projector apparatus projects video on a table.

Projector apparatus 100 will be described as a specific example of a projection apparatus according to the present disclosure. A video projection operation to be performed by projector apparatus 100 will be briefly described with reference to FIG. 1 and FIG. 2. FIG. 1 is a diagram illustrating a state in which projector apparatus 100 projects video on wall 140. FIG. 2 is a diagram illustrating a state in which projector apparatus 100 projects video on table 150.

As illustrated in FIG. 1 and FIG. 2, projector apparatus 100 is fixed to housing 120 together with driving unit 110. Wiring electrically connected to components of projector apparatus 100 and driving unit 110 is connected to a power supply through housing 120 and wiring duct 130. This allows electric power to be supplied to projector apparatus 100 and driving unit 110. Projector apparatus 100 has aperture 101. Projector apparatus 100 projects video through aperture 101.

Driving unit 110 can drive projector apparatus 100 to change a projection direction of projector apparatus 100. As illustrated in FIG. 1, driving unit 110 can drive projector apparatus 100 so that the projection direction of projector apparatus 100 may be a direction toward wall 140. This allows projector apparatus 100 to project video 141 on wall 140. Similarly, driving unit 110 can drive projector apparatus 100 so that the projection direction of projector apparatus 100 may be a direction toward table 150, as illustrated in FIG. 2. This allows projector apparatus 100 to project video 151 on table 150. Driving unit 110 may drive projector apparatus 100 in response to a manual operation of a user, or may drive projector apparatus 100 automatically in accordance with a detection result of a predetermined sensor. In addition, video 141 to be projected on wall 140 and video 151 to be projected on table 150 may have different content, or may have identical content.

Projector apparatus 100 is equipped with user interface device 200. This enables projector apparatus 100 to perform various control operations on projection video according to a human operation or a position at which a person stands.

The configuration and operations of projector apparatus 100 will be described in detail below.

<1. Configuration of Projector Apparatus>

Figure 3:
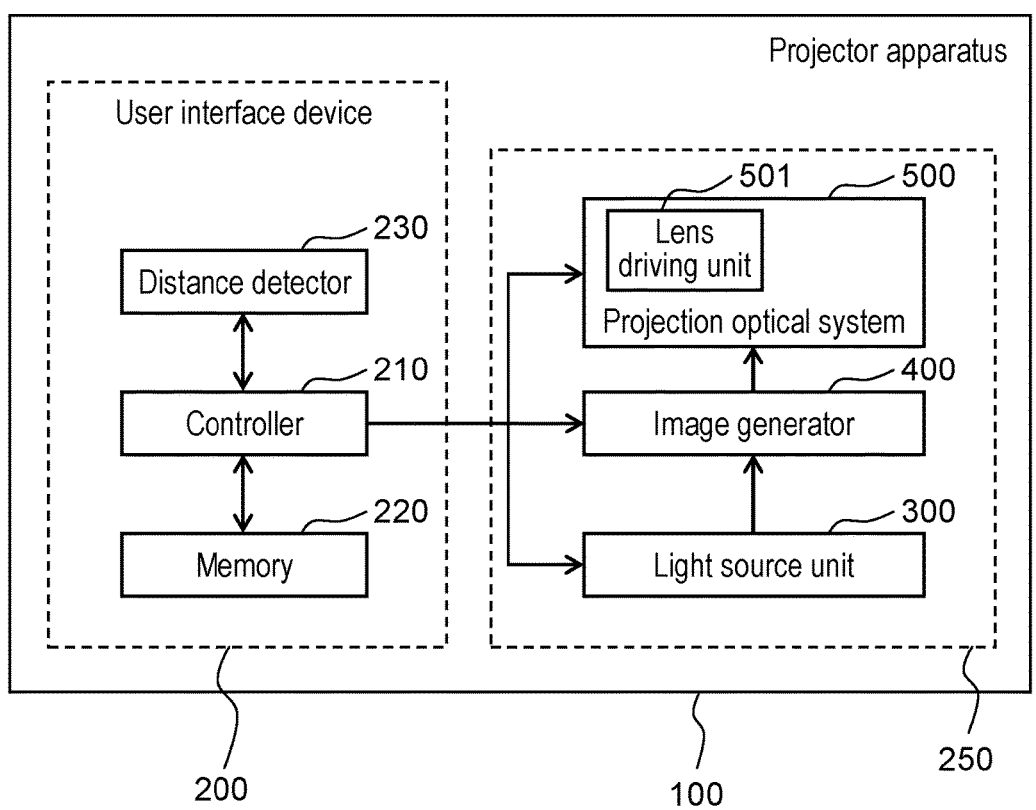
FIG. 3 is a block diagram illustrating an electric configuration of the projector apparatus.

FIG. 3 is a block diagram illustrating an electric configuration of projector apparatus 100. Projector apparatus 100 includes user interface device 200 and projection unit 250. User interface device 200 includes controller 210, memory 220, and distance detector 230. Projection unit 250 includes light source unit 300, image generator 400, and projection optical system 500. The configuration of each unit that constitutes projector apparatus 100 will be sequentially described below.

Controller 210 is a semiconductor element that controls projector apparatus 100 as a whole. That is, controller 210 controls operations of each unit that constitutes user interface device 200 (distance detector 230, memory 220), light source unit 300, image generator 400, and projection optical system 500. Also, controller 210 can perform digital zoom control for scaling a projection image by video signal processing. Controller 210 may be configured using only hardware, and may be implemented by combining hardware and software.

Memory 220 is a storage element for storing various kinds of information. Memory 220 is configured using a flash memory, ferroelectric memory, and the like. Memory 220 stores information such as a control program for controlling projector apparatus 100. In addition, memory 220 stores various kinds of information supplied from controller 210. Furthermore, memory 220 stores data such as a setting of a projection size for displaying the projection video, and a table of focus values according to distance information to a projection target.

Distance detector 230 includes, for example, a time-of-flight (TOF) sensor, and linearly detects a distance to an opposing surface. When distance detector 230 faces wall 140 or table 150, distance detector 230 detects the distance from distance detector 230 to wall 140 or table 150.

Figure 4A:
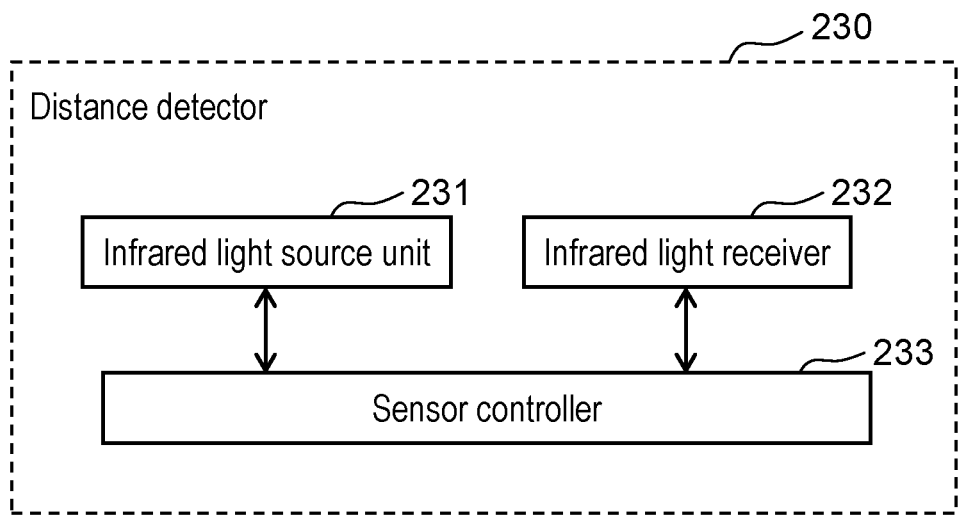
FIG. 4A is a block diagram illustrating an electric configuration of a distance detector.

FIG. 4A is a block diagram illustrating an electric configuration of distance detector 230. As illustrated in FIG. 4A, distance detector 230 includes infrared light source unit 231 for emitting infrared detecting light, infrared light receiver 232 for receiving the infrared detecting light reflected by the opposing surface, and sensor controller 233 for controlling infrared light source unit 231 and infrared light receiver 232. Infrared light source unit 231 emits the infrared detecting light to be diffused to all over the surroundings through aperture 101. Infrared light source unit 231 uses, for example, infrared light having wavelengths in a range from 850 nm to 950 nm as the infrared detecting light. Controller 210 stores, in memory 220, a phase of the infrared detecting light emitted from infrared light source unit 231. When the opposing surface is not equally distant from distance detector 230 and has an inclination or shape, multiple pixels arranged on an imaging surface of infrared light receiver 232 each receive reflected light with separate timing. Since the reflected light is received with separate timing, the infrared detecting light received by infrared light receiver 232 differs in phase at each of the pixels. Controller 210 stores, in memory 220, the phase of the infrared detecting light received by infrared light receiver 232 at each pixel.

Controller 210 reads, from memory 220, the phase of the infrared detecting light emitted by infrared light source unit 231, and the phase of the infrared detecting light received by infrared light receiver 232 at each pixel. Controller 210 can measure the distance from distance detector 230 to the opposing surface, based on a phase difference between the infrared detecting light emitted by distance detector 230 and the received infrared detecting light.

Figure 4B:
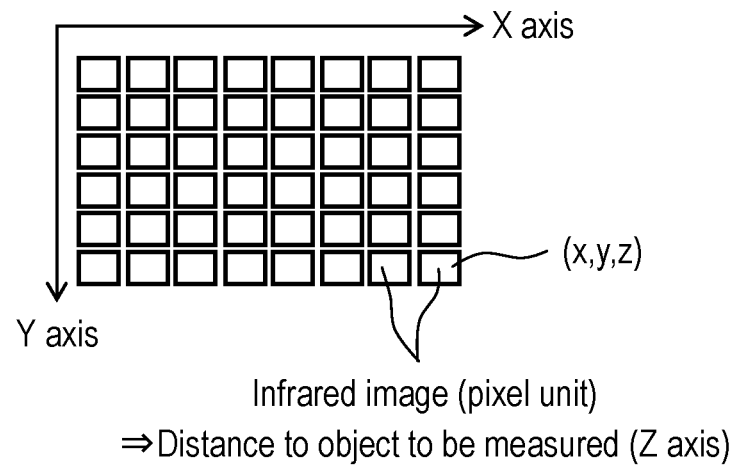
FIG. 4B is a diagram for describing an infrared image captured by the distance detector.

FIG. 4B is a diagram for describing distance information acquired by distance detector 230 (infrared light receiver 232). Distance detector 230 detects the distance at every pixel that constitutes an infrared image made by the received infrared detecting light. This allows controller 210 to obtain a detection result of the distance over the whole range of angle of view of the infrared image received by distance detector 230 on a pixel-by-pixel basis. In the following description, as illustrated in FIG. 4B, the X-axis indicates a horizontal direction, and the Y-axis indicates a vertical direction of the infrared image. Then, the Z-axis indicates a direction of the detected distance. Controller 210 can acquire three-axis (XYZ) coordinates at each pixel (x, y, z) that constitutes the infrared image, based on the detection result of distance detector 230. That is, controller 210 can acquire the distance information based on the detection result of distance detector 230.

Although the TOF sensor has been illustrated as distance detector 230 in the above description, the present disclosure is not limited to this example. That is, a device may be used for emitting light of a known pattern such as a random dot pattern and for calculating a distance from displacement of the pattern, and a device using parallax caused by a stereoscopic camera may be used.

Figure 5:
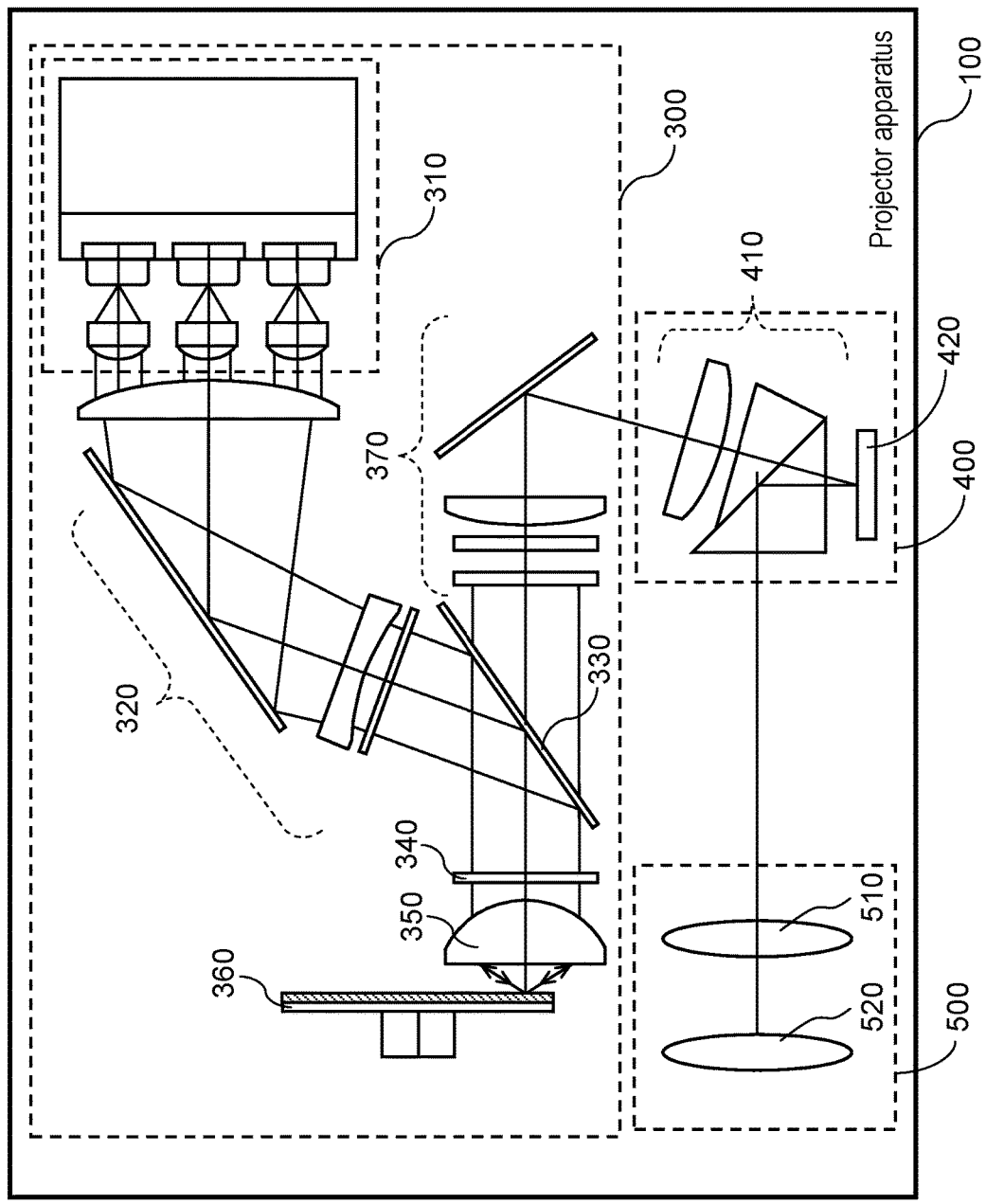
FIG. 5 is a block diagram illustrating an optical configuration of the projector apparatus.

Subsequently, configurations of light source unit 300, image generator 400, and projection optical system 500 will be described with reference to FIG. 5. FIG. 5 is a block diagram illustrating an optical configuration of projector apparatus 100. As illustrated in FIG. 5, light source unit 300 supplies light necessary for generating a projection image to image generator 400. Image generator 400 supplies generated video to projection optical system 500. Projection optical system 500 applies optical conversion such as focusing and zooming to the video supplied from image generator 400. Projection optical system 500 faces aperture 101, and the video is projected from aperture 101.

First, the configuration of light source unit 300 will be described. As illustrated in FIG. 5, light source unit 300 includes semiconductor laser 310, dichroic mirror 330, quarter-wave plate 340, and phosphor wheel 360.

Semiconductor laser 310 is a solid light source that emits, for example, s-polarized blue light having wavelengths in a range from 440 nm to 455 nm. The s-polarized blue light emitted from semiconductor laser 310 enters dichroic mirror 330 through light-guiding optical system 320.

Dichroic mirror 330 is an optical element that has, for example, a high reflectance of 98% or more with respect to s-polarized blue light having wavelengths in a range from 440 nm to 455 nm. This optical element also has high transmittance of 95% or more with respect to p-polarized blue light having wavelengths in a range from 440 nm to 455 nm, and with respect to green light to red light having wavelengths in a range from 490 nm to 700 nm regardless of the state of polarization. Dichroic mirror 330 reflects s-polarized blue light emitted from semiconductor laser 310 in a direction of quarter-wave plate 340.

Quarter-wave plate 340 is a polarizing element that converts linear polarization into circular polarization, or converts circular polarization into linear polarization. Quarter-wave plate 340 is disposed between dichroic mirror 330 and phosphor wheel 360. The s-polarized blue light that enters quarter-wave plate 340 is converted into circularly polarized blue light, and is then emitted on phosphor wheel 360 through lens 350.

Phosphor wheel 360 is a flat plate made of aluminum and the like configured to allow high-speed revolution. On a surface of phosphor wheel 360, there are formed a plurality of areas including a B area, which is an area of a diffuse reflecting surface, a G area on which green light-emitting phosphor is applied, and an R area on which red light-emitting phosphor is applied.

The circularly polarized blue light emitted on the B area of phosphor wheel 360 undergoes diffuse reflection and then enters quarter-wave plate 340 again as circularly polarized blue light. The circularly polarized blue light incident on quarter-wave plate 340 is converted into p-polarized blue light, and then enters dichroic mirror 330 again. The blue light incident on dichroic mirror 330 at this time, which is p-polarized light, passes through dichroic mirror 330 and enters image generator 400 through light-guiding optical system 370.

The blue light emitted on the G area or R area of phosphor wheel 360 excites phosphor applied on the G area or R area to cause emission of green light or red light. The green light or red light emitted from the G area or R area enters dichroic mirror 330. At this time, the green light or red light entering dichroic mirror 330 passes through dichroic mirror 330, and enters image generator 400 through light-guiding optical system 370.

Since phosphor wheel 360 rotates at a high speed, the blue light, green light, and red light are emitted from light source unit 300 to image generator 400 in a time-sharing manner.

Image generator 400 generates a projection image according to a video signal supplied from controller 210. Image generator 400 includes digital-mirror-device (DMD) 420 and the like. DMD 420 is a display element having a large number of micro mirrors arranged on a plane. DMD 420 deflects each of the arranged micro mirrors in accordance with the video signal supplied from controller 210 to spatially modulate incident light. DMD 420 repeatedly receives the blue light, green light, and red light emitted through light-guiding optical system 410 sequentially in a time-sharing manner. DMD 420 deflects each of the micro mirrors in synchronization with timing with which the light of each color is emitted. This causes image generator 400 to generate the projection image in accordance with the video signal. In accordance with the video signal, DMD 420 deflects the micro mirrors to light that travels to projection optical system 500 and light that travels out of an effective range of projection optical system 500. This allows image generator 400 to supply projection optical system 500 with the generated projection image.

Projection optical system 500 includes optical members, such as zoom lens 510 and focus lens 520, and lens driving unit 501 for driving the optical members. Lens driving unit 501 is configured using a motor, for example. Projection optical system 500 enlarges light incident from image generator 400 and projects the light on the projection surface. Controller 210 can control a projection area on a projection target so as to obtain a desired zoom value by controlling drive of lens driving unit 501 to adjust a position of zoom lens 510. To increase the zoom value, controller 210 moves the position of zoom lens 510 in a direction in which an angle of view decreases (telephoto side) to narrow the projection area. To decrease the zoom value, on the other hand, controller 210 moves the position of zoom lens 510 in the direction in which the angle of view increases (wide side) to widen the projection area. In addition, controller 210 can adjust the focus of the projection video by adjusting a position of focus lens 520 based on predetermined zoom tracking data so as to follow movement of zoom lens 510.

Although the above-described configuration uses a digital-light-processing (DLP) system using DMD 420 as an example of projector apparatus 100 above, the present disclosure is not limited to this example. That is, the configuration under a liquid crystal system may be adopted as projector apparatus 100.

Although the above-described configuration uses a single plate system under which the light source using phosphor wheel 360 is time-shared as an example of projector apparatus 100, the present disclosure is not limited to this example. That is, projector apparatus 100 may adopt a configuration under a three-light source system including various light sources of blue light, green light, and red light. Projector apparatus 100 may also adopt a configuration under a three-plate system including DMD for each color of RGB.

Although the above-described configuration has separate units including the blue light source for generating the projection video and the infrared light source for measuring distances, the present disclosure is not limited to this example. That is, the blue light source for generating the projection video and the infrared light source for measuring distances may be integrated into one unit. When the three-light source system is adopted, the light sources of respective colors and the infrared light source may be integrated into one unit.

<2. Operations>

2-1. Operations of User Interface Device

Next, operations of user interface device 200 equipped in projector apparatus 100 will be described. User interface device 200 includes distance detector 230, controller 210, and memory 220. User interface device 200 controls projection unit 250 including light source unit 300, image generator 400, and projection optical system 500.

Distance detector 230 detects the distance to the projection target and the distance to an object, such as a person, positioned in a projection range, and outputs the distance to controller 210 as distance information. Controller 210 calculates an optical zoom value and focus value based on the distance information acquired from distance detector 230.

Controller 210 performs video signal processing for generating the video signal of the projection video. In addition, based on the distance information acquired from distance detector 230, controller 210 performs the digital zoom in the video signal processing to adjust a projection size of the projection video. In accordance with an instruction to change the projection size of the projection video, controller 210 corrects the projection image by the digital zoom to output the corrected projection video to image generator 400. In accordance with the projection video, controller 210 causes lens driving unit 501 to move zoom lens 510 based on the optical zoom value according to the changed projection size. Controller 210 then moves focus lens 520 based on predetermined zoom tracking data.

2-2. Projection Operation of Projector Apparatus

Next, projection operations of projector apparatus 100 will be described. By the operations of user interface device 200 described above, projector apparatus 100 uses the distance information to detect a specific person, such as a user, follows movement of the detected person, and projects a predetermined projection video in the vicinity of the person. Projector apparatus 100 is installed, for example, in a place such as a corridor and passage, and projects projection video on a projection surface, such as a wall and floor, following a passing person. The projection video may be a still picture or may be a moving picture.

Here, changing the size of the projection video causes variations in image quality of the projection video, which makes the projection video difficult to view for a user. PTL 1 does not disclose a method for addressing variations in image quality of the projection video when the size of the projection video is changed. In order to secure image quality of the projection video, the present exemplary embodiment performs video signal processing and controls optical zoom as follows.

First, with reference to FIG. 6A to FIG. 6E and FIG. 7A to FIG. 7E, the following describes the projection operation for changing the projecting position of the projection video in accordance with movement of a person positioned in the vicinity of the projection surface (standing position of the person). FIG. 6A to FIG. 6E are diagrams for describing projection control according to a standing position of a person. FIG. 7A to FIG. 7E are diagrams subsequent to FIG. 6A to FIG. 6E for describing projection control.

Figure 6A:
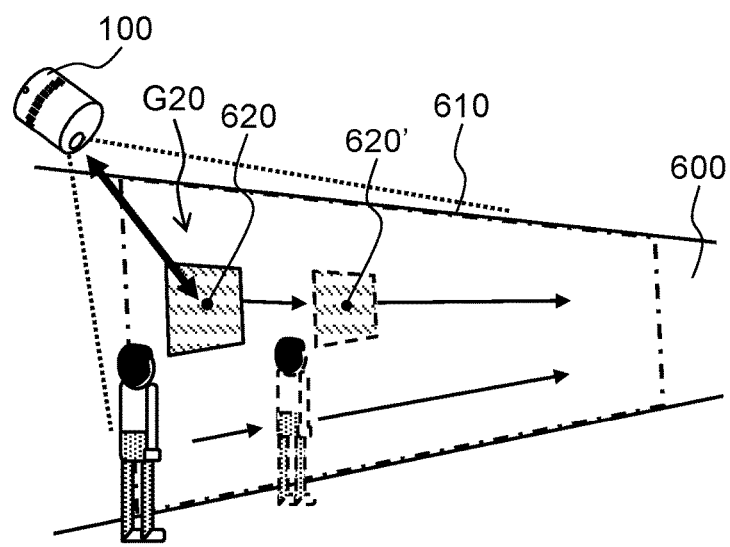
FIG. 6A is a diagram illustrating a state in which a person is at a position close to the projector apparatus.
Figure 6B:
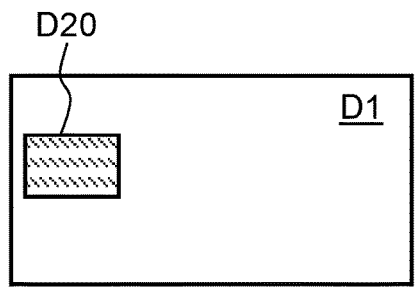
FIG. 6B is a schematic view illustrating an image presented by video signal processing of FIG. 6A.
Figure 6C:
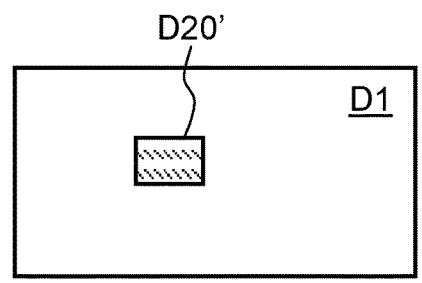
FIG. 6C is a schematic view illustrating an image presented by the video signal processing to the person who moves away from a position of FIG. 6B.
Figure 6D:
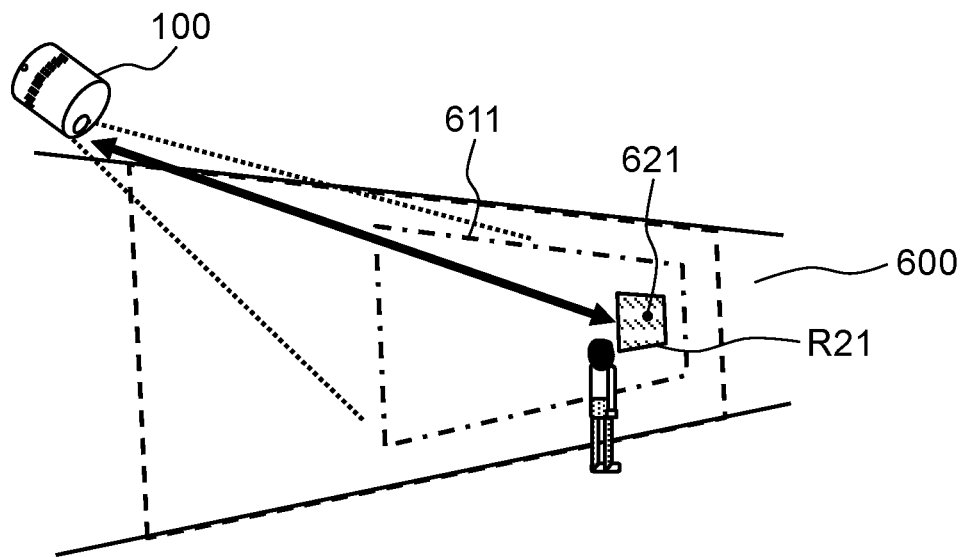
FIG. 6D is a diagram illustrating a state in which the person moves from the position of FIG. 6A to a position far from the projector apparatus.
Figure 6E:
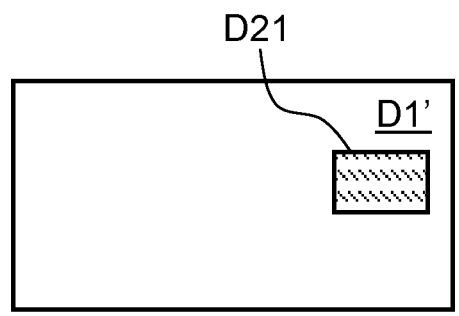
FIG. 6E is a schematic view illustrating an image presented by the video signal processing of FIG. 6D.

First, with reference to FIG. 6A to FIG. 6E, the following describes the projection operations in a case where a person to be followed moves away from projector apparatus 100. FIG. 6A is a diagram illustrating a state in which a person is at a position close to projector apparatus 100 (nearby position). FIG. 6B and FIG. 6C are schematic views illustrating images presented by video signal processing of FIG. 6A. FIG. 6D is a diagram illustrating a state in which the person moves to a position far from projector apparatus 100 (distant position). FIG. 6E is a schematic view illustrating an image presented by the video signal processing of FIG. 6D.

As illustrated in FIG. 6A and FIG. 6D, when the person who enters from a position close to projector apparatus 100 (nearby position) moves to a far position (distant position), projector apparatus 100 follows the movement of the person to move projection video G20 from projecting position 620 to projecting position 621. Here, in the state illustrated in FIG. 6A, it is assumed that, at projecting position 620 relatively close to projector apparatus 100, the projected projection video has a sufficient resolution in the projection size specified in advance. It is also assumed that projection surface 600 is a planar wall surface.

Projector apparatus 100 sets, by the optical zoom control, projectable area 610 which is an area in which video can be projected on projection surface 600. Projector apparatus 100 causes projection video G20 to follow the person in a range of projectable area 610, by performing video signal processing for shifting object D20 indicating projection video G20 within image D1 (FIG. 6B, FIG. 6C) of an angle of view according to projectable area 610. FIG. 6B and FIG. 6C omit geometric correction and schematically illustrate image D1 on a video signal in the video signal processing. Other schematic views illustrating images presented by the video signal processing are illustrated in a similar manner to FIG. 6B and FIG. 6C.

In this case, since projection video G20 follows the person who moves away from projector apparatus 100, shifting the position of object D20 within image D1 in the video signal processing with the constant size of object D20 will increase the projection size on projection surface 600 as the position of object D20 moves away from projector apparatus 100. This is because, as general characteristics of a projector apparatus, when the optical zoom value is maintained constant, that is, when the angle of view is maintained constant, the projection size of the projection video increases as the projecting position at which a video is projected moves farther. In order to maintain the constant projection size in the video signal processing, projector apparatus 100 performs the digital zoom for reducing the object within image D1, as illustrated in FIG. 6B and FIG. 6C.

Subsequently, as the person moves to a position farther from projector apparatus 100 (distant position), projector apparatus 100 projects the video at a position farther from projector apparatus 100, as illustrated in FIG. 6D. At this time, if the projection size is continuously decreased using the digital zoom in order to maintain the constant projection size in the video signal processing, the number of pixels contained in the projection size decreases. Therefore, the resolution of projection video G20 on projection surface 600 will deteriorate.

Therefore, in a case where the projection video follows the person who moves away from projector apparatus 100, projector apparatus 100 according to the present disclosure is configured, when reduction in the projection size using the digital zoom deteriorates the resolution significantly, to perform control for increasing the optical zoom value and to decrease the angle of view. This control narrows the projectable area of projector apparatus 100 from projectable area 610 illustrated in FIG. 6A to projectable area 611 illustrated in FIG. 6D. Along with this narrowing operation, projector apparatus 100 performs the video signal processing on image D1' corresponding to narrowed projectable area 611 (FIG. 6E). As illustrated in FIG. 6E, this allows projector apparatus 100 to inhibit reduction of the number of pixels contained in object D21 that represents the projection size on image D1' to maintain the resolution of the projection video.

Figure 7A:
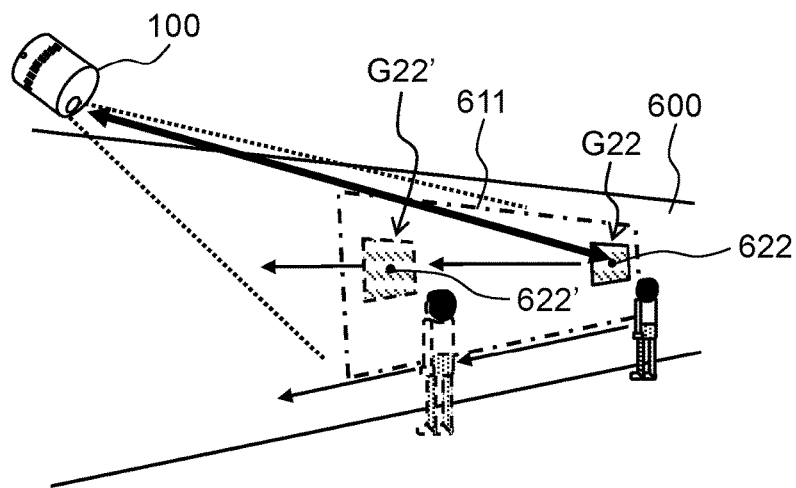
FIG. 7A is a diagram illustrating a state subsequent to the state illustrated in FIG. 6D, in which the person is at the position far from the projector apparatus.
Figure 7B:
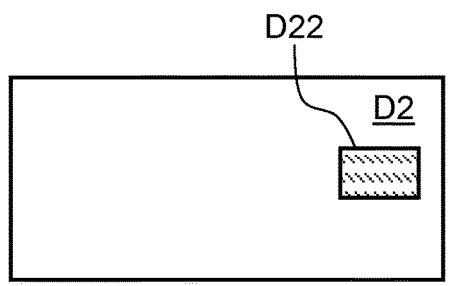
FIG. 7B is a schematic view illustrating an image presented by the video signal processing of FIG. 7A.
Figure 7C:
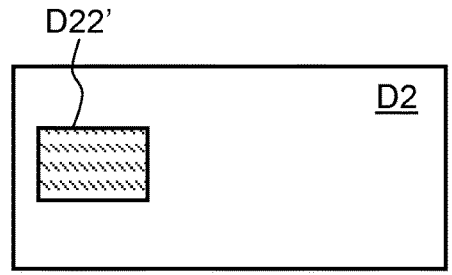
FIG. 7C is a schematic view illustrating an image presented by the video signal processing to the person who approaches from the position of FIG. 7B.
Figure 7D:
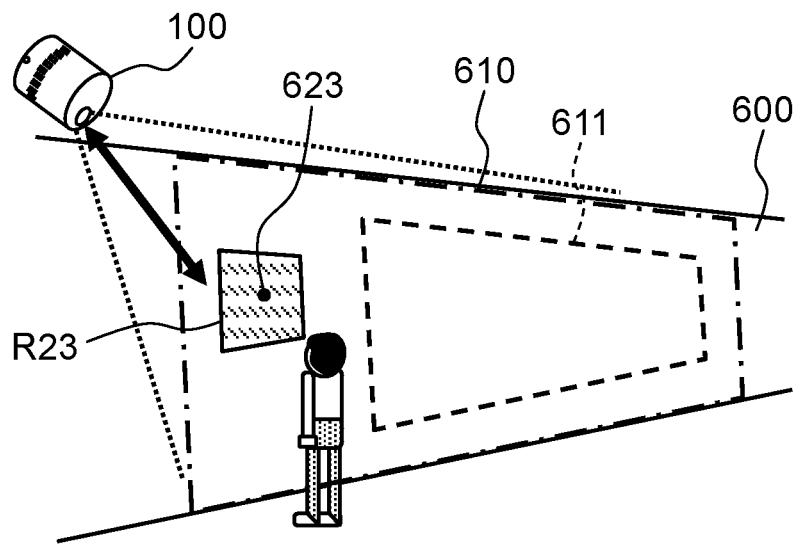
FIG. 7D is a diagram illustrating a state in which the person moves from the position illustrated in FIG. 7A to a position close to the projector apparatus.
Figure 7E:
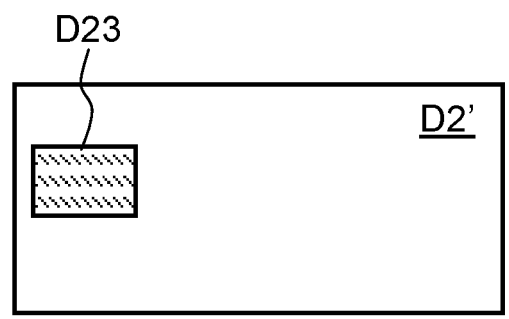
FIG. 7E is a schematic view illustrating an image presented by the video signal processing of FIG. 7D.

Next, with reference to FIG. 7A to FIG. 7E, the following describes the projection operation in a case where the person to be followed approaches projector apparatus 100. FIG. 7A is a diagram illustrating a state subsequent to the state illustrated in FIG. 6D, in which the person is at the position far from projector apparatus 100 (distant position). FIG. 7B and FIG. 7C are schematic views illustrating images presented by the video signal processing of FIG. 7A. FIG. 7D is a diagram illustrating a state in which the person moves from the position illustrated in FIG. 7A to a position close to projector apparatus 100 (nearby position). FIG. 7E is a schematic view illustrating an image presented by the video signal processing of FIG. 7D.

As illustrated in FIG. 7A and FIG. 7D, in a case where the person who is at the position far from projector apparatus 100 (distant position) moves to the position close to projector apparatus 100 (nearby position), projector apparatus 100 follows the movement of the person to move projection video G22 from projecting position 622 to projecting position 623. When the person is at the position far from projector apparatus 100 (distant position) (FIG. 7A), projector apparatus 100 sets projectable area 611 such that projection video G22 at projecting position 622 may maintain the predetermined resolution. Projector apparatus 100 performs the video signal processing for moving object D22 indicating projection video G22 on image D2 of the angle of view according to projectable area 611 (FIG. 7B, FIG. 7C). The projection video of whole image D2 on the video signal will be projected on projectable area 611. The video signal processing on image D2 allows projection video G22 to follow the person from projecting position 622 to projecting position 622' in the range of projectable area 611.

As the person moves to the position close to projector apparatus 100 (nearby position), projector apparatus 100 moves projection video G22 to the position close to projector apparatus 100. In this case, in the video signal processing, when object D22 within image D2 protrudes from a boundary of image D2, projection video G22 will be displayed incompletely on projection surface 600.

In addition, projecting position 623, at which the person is close to projector apparatus 100 as illustrated in FIG. 7D, is outside the range of projectable area 611 that is set when the person is at the position far from projector apparatus 100. Therefore, in this state, projector apparatus 100 cannot project the video at projecting position 623.

Therefore, projector apparatus 100 according to the present exemplary embodiment performs control for decreasing the optical zoom value and increasing the angle of view when projection video G22 does not stay within projectable area 611 in the video signal. As illustrated in FIG. 7D, this control enlarges projectable area 611 to projectable area 610 and causes projecting position 623 to stay within the range of projectable area 610. Then, as illustrated in FIG. 7E, projector apparatus 100 can project the projection video at projecting position 623 by performing the video signal processing for moving object D23 within image D2' corresponding to enlarged projectable area 610. Thus, projector apparatus 100 can display the projection video completely at a desired projecting position by adjusting the optical zoom and enlarging the projectable area.

As described above, the optical zoom may need control for increasing the angle of view, and for example, when the person illustrated in FIG. 6D further moves away from projector apparatus 100, the optical zoom control may not secure the resolution. Therefore, in such a case, the present exemplary embodiment drives driving unit 110 so as to change the projection direction of the projection video. Drive control of driving unit 110 can move the projectable area in a direction of moving away from projector apparatus 100, and can display the projection video in a wider range.

2-3. Flow of Projection Operation

Figure 8:
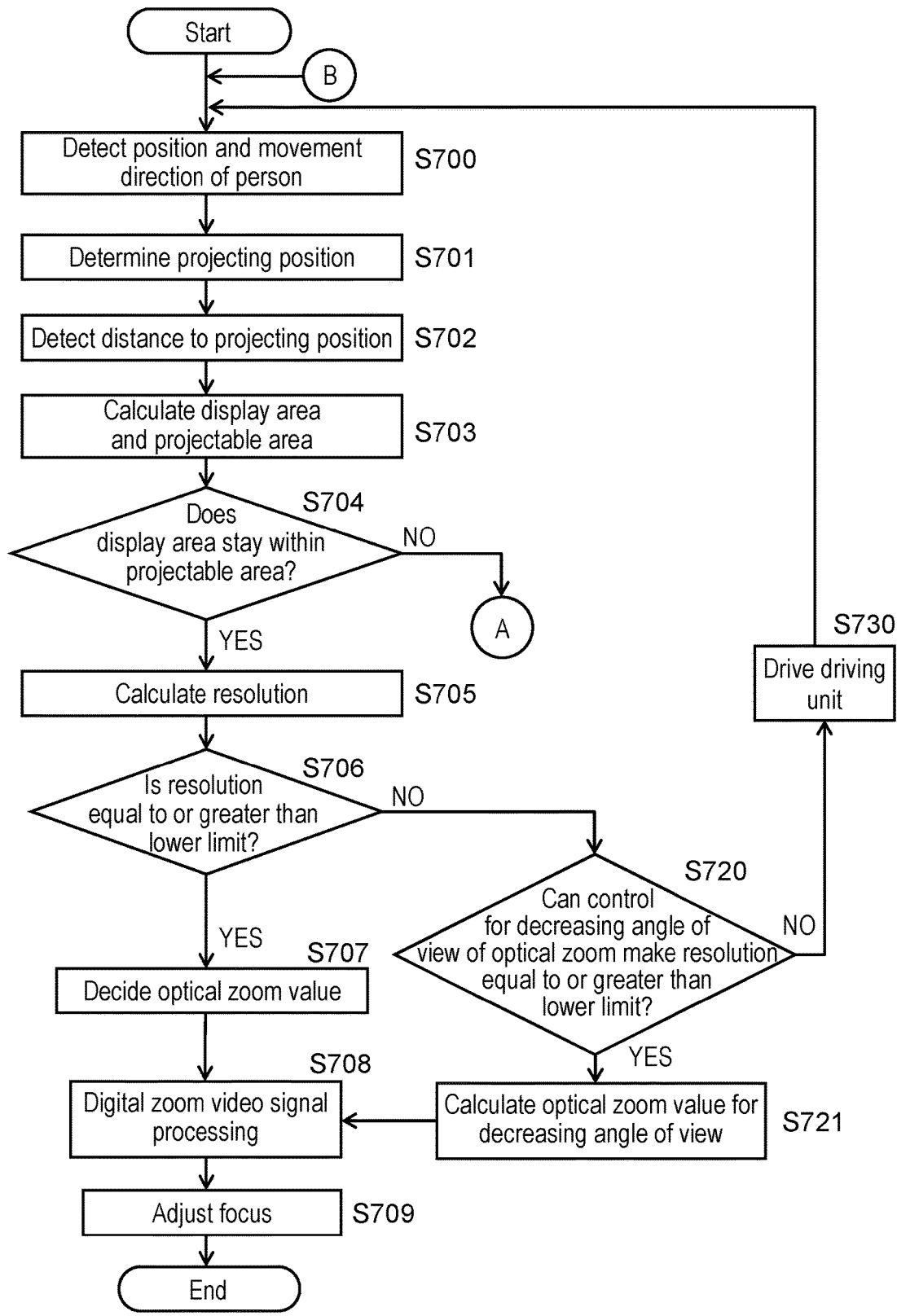
FIG. 8 is a flowchart illustrating a flow of operations of the projector apparatus according to the first exemplary embodiment.
Figure 9:
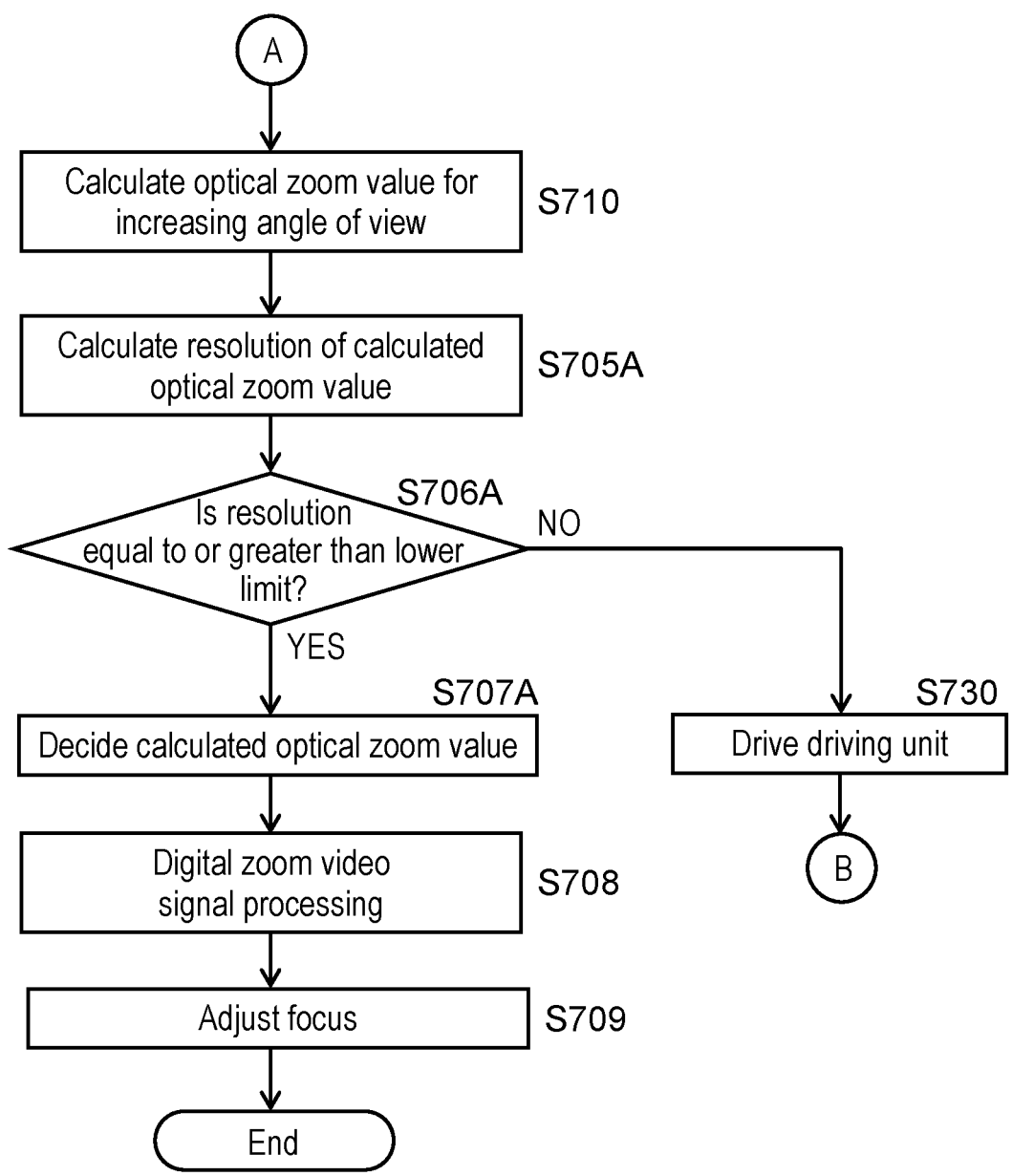
FIG. 9 is a flowchart illustrating a flow of operations of the projector apparatus subsequent to FIG. 8.
Figure 10:
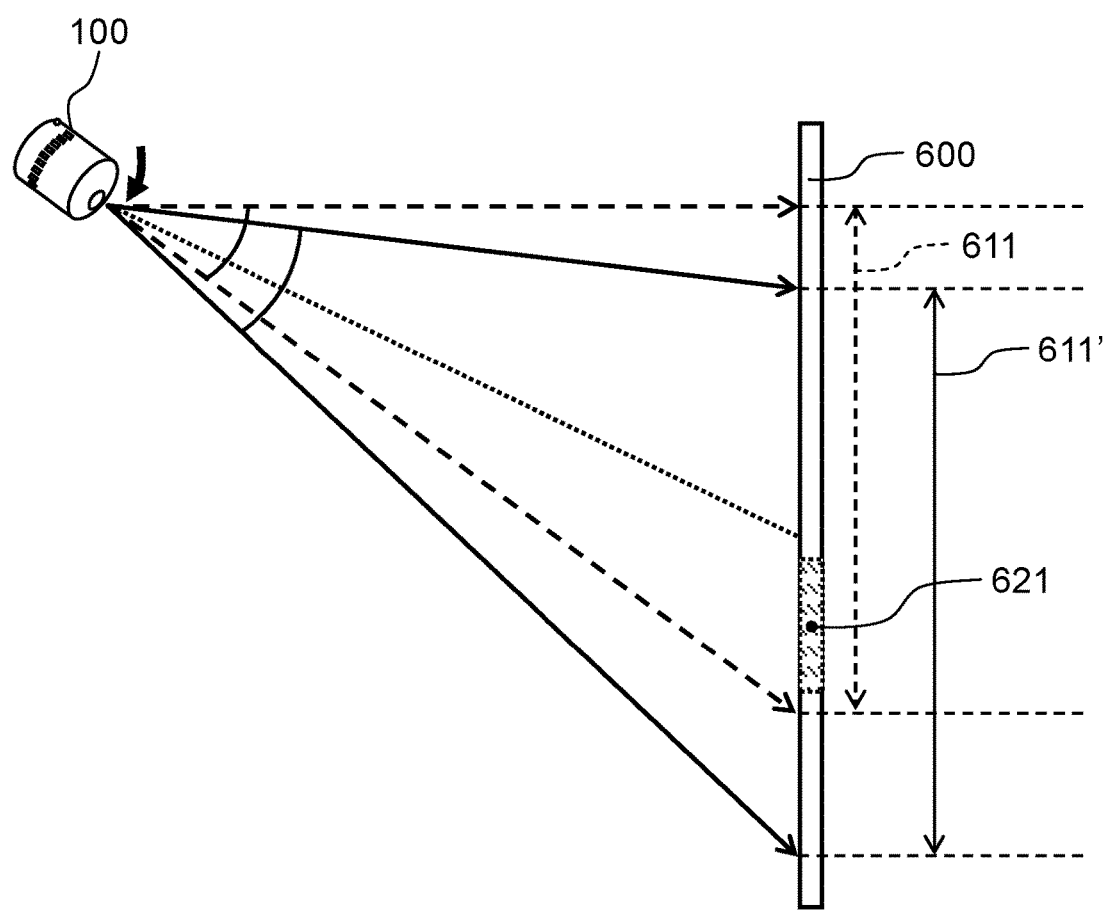
FIG. 10 is a diagram for describing a change in a projection direction to be made by a driving unit.

A flow of the aforementioned operations will be described with reference to FIG. 6 to FIG. 10. FIG. 8 and FIG. 9 are flowcharts illustrating the flow of the operations of projector apparatus 100. FIG. 10 is a diagram for describing a change in the projection direction to be made by driving unit 110.

This flow is performed by controller 210 of projector apparatus 100.

First, controller 210 controls distance detector 230 to detect the position and movement direction of the person to be followed (S700). Specifically, distance detector 230 detects distance information in space in the vicinity of the projection surface, and controller 210 acquires this distance information. Controller 210 previously stores, in memory 220, feature information indicating a feature of a shape of the person, reads the feature information from memory 220, and compares the shape of the person indicated by the feature information with a shape based on the distance information. Based on this comparison result, controller 210 recognizes the person and detects the position.

For example, controller 210 may previously measure distance information indicating distances to the wall and floor at the time of installation of projector apparatus 100 and store the information in memory 220. Controller 210 may then detect the position of the person based on a difference between the previously stored distance information and the distance information measured when the person exists. Alternatively, in a situation in which there is no moving object other than the person, controller 210 may acquire the distance information regularly, may detect a section in which the distance changes as necessary, and may recognize the section as a person. Also, controller 210 may detect the movement direction of the person based on the change in the regularly acquired distance information.

Next, based on a detection result of the position and movement direction of the person in step S700, controller 210 determines the projecting position of the projection video of the object on projection surface 600 (S701). In order to provide easy-to-see display for the moving person, for example, controller 210 calculates a position spaced apart by a predetermined distance from the detected position of the person in the movement direction, and then determines the projecting position. This enables display of the projection video at an easy-to-see place in a direction in which the moving person views. Thus, detection of the position and movement direction of the person allows determination of more appropriate projecting position of the projection video.

Also, controller 210 may calculate a position of a foot of a perpendicular line from the position of the person to the projection surface to determine the projecting position near the calculated position. In this case, the projecting position may be determined with only information on the position of the person without detection of the movement direction of the person in step S700.

Next, based on the distance information from distance detector 230, controller 210 detects the distance from projector apparatus 100 to the projecting position (S702). Distance information to be acquired in step S702 serves as a parameter to be used in processing for determining the size and focus value on the image of the projection video for a specific optical zoom value in subsequent processing.

Next, based on information acquired in processing of steps S700 to S702, controller 210 calculates a display area of the projection video and the projectable area on the projection surface (S703). The display area is an area, on the projection surface, occupied by the projection video displayed in desired projection size at the projecting position according to the person to be followed. Controller 210 calculates the display area on the projection surface based on the projecting position determined in processing of step S701, distance information detected in processing of step S702, and desired projection size stored in memory 220.

The projectable area is an area that indicates a range in which projector apparatus 100 may project an image on the projection surface. The projectable area is defined by the distance between projector apparatus 100 and projection surface 600, and by the angle of view (optical zoom value). Controller 210 calculates the projectable area based on information indicating the distance to the projecting position detected in processing of step S702 and the optical zoom value of the current state. Since the optical zoom value and the angle of view are in a one-to-one relationship, controller 210 can calculate the projectable area from the optical zoom value and the distance information. Details of a method for calculating the projectable area will be described later.

Next, controller 210 determines whether the calculated display area stays within the range of the projectable area (S704). Determination processing of step S704 is performed, for example, as illustrated in FIG. 7A, when projection video G22' displayed in the vicinity of a boundary of projectable area 611 is moved, in order to prevent the display area of projection video G22' from protruding from projectable area 611 after the movement.

For example, as illustrated in FIG. 6A, when the person close to projector apparatus 100 moves away from projector apparatus 100, controller 210 determines that the display area stays within the range of the projectable area (YES in S704), and then controller 210 goes to processing of step S705. On the other hand, as illustrated in FIG. 7A, when projection video G22' displayed in the vicinity of the boundary of projectable area 611 is moved across the boundary, controller 210 determines that the display area fails to stay within the range of the projectable area (NO in S704), and then controller 210 goes to processing of step S710. Processing after step S710 will be described later.

When it is determined that the display area stays within the range of the projectable area (YES in S704), controller 210 calculates the resolution of the video to be projected in the display area on the projection surface (S705).

Next, controller 210 determines whether the resolution calculated in step S705 is equal to or greater than a lower limit of a predetermined resolution (S706). Determination processing of step S706 is performed in order to secure image quality, for example, as illustrated in FIG. 6A and FIG. 6D, when following the person moving away from projector apparatus 100 leads to deterioration in the resolution of the projection video caused by the digital zoom.

When it is determined that the resolution of the projection video is equal to or greater than the lower limit (YES in S706), controller 210 decides the optical zoom value of the current situation as a determined value (S707).

Next, controller 210 performs video signal processing including the digital zoom based on the decided optical zoom value (S708). In processing of step S708, controller 210 determines a digital zoom value based on the decided optical zoom value and the projection size of the display area (S708). Controller 210 generates the video signal that indicates the object positioned at coordinates corresponding to the projecting position determined in step S701 on the image presented by the video signal processing, the object having the size corresponding to the display area calculated in step S703. In addition, controller 210 performs geometric correction according to the direction of projection surface 600 based on the distance information from distance detector 230. Controller 210 controls image generator 400 in accordance with the generated video signal.

For example, as illustrated in FIG. 6A, when projection video G20 is moved from projecting position 620 to projecting position 620', controller 210 determines that the resolution of the moved projection video is equal to or greater than the lower limit (YES in S706). Controller 210 does not change the optical zoom value (S707), performs the digital zoom in the video signal processing of step S708, maintains the projection size, and moves projection video G20. Although object D20 is shifted and reduced by the digital zoom within image D1 illustrated in FIG. 6B, reduced object D20' (FIG. 6C) will be generated in resolution equal to or greater than the lower limit.

When it is determined that the calculated resolution is smaller than the lower limit (NO in S706), controller 210 determines whether control for decreasing the angle of view of the optical zoom can make the resolution of the projection video equal to or greater than the lower limit (S720). Determination processing of step S720 is performed in order to verify whether control of optical zoom is effective, for example, as illustrated in FIG. 6A and FIG. 6D, in a case where the person to be followed moves away from projector apparatus 100 and the resolution equal to or greater than the lower limit may not be secured by the digital zoom.

Specifically, controller 210 determines whether the optical zoom value can be increased to the resolution equal to or greater than the lower limit within an adjustable range of zoom lens 510. The adjustable range of zoom lens 510 is set such that, for example, the display area calculated in step S703 stays within the projectable area when the optical zoom value is changed, together with mechanical characteristics of zoom lens 510.

When it is determined that control for decreasing the angle of view of optical zoom can make the resolution equal to or greater than the lower limit (YES in S720), controller 210 calculates the optical zoom value that allows the resolution to become equal to or greater than the lower limit, and decides the calculated optical zoom value as a determined value (S721). The optical zoom value to be calculated may be a value that makes the resolution coincide with the lower limit, and may be a value larger than the value that makes the resolution coincide with the lower limit by a predetermined width. Based on the decided optical zoom value, controller 210 controls lens driving unit 501 to adjust the position of zoom lens 510. Based on the calculated optical zoom value, controller 210 performs the video signal processing of step S708.

Positioning of zoom lens 510 is performed by, for example, previous storage, in memory 220, of a data table indicating a relationship between the optical zoom value (angle of view) and the position of zoom lens 510, and by controller 210 reading the data table. Instead of the data table, information indicating an equation that derives the relationship between the optical zoom value (angle of view) and the position of zoom lens 510 may be stored in memory 220, and controller 210 perform calculation of the equation to perform positioning of zoom lens 510.

For example, as illustrated in FIG. 6D, when the projection video is projected in display area R21 at projecting position 621, it is determined that the resolution is smaller than the lower limit in projectable area 610 (NO in S706), and it is determined that a change in the optical zoom may make the resolution equal to or greater than the lower limit (YES in S720). In step S706, for example, controller 210 determines that the number of pixels corresponding to display area R21 is smaller than the number of pixels of the lower limit within image D1 corresponding to projectable area 610. In step S720, for example, first, controller 210 calculates projectable area 611 from which display area R21 does not protrude by decreasing the angle of view from projectable area 610. Controller 210 then calculates the number of pixels corresponding to display area R21 on image D1' (FIG. 6E) corresponding to projectable area 611, and determines that the calculated number of pixels is equal to or greater than the lower limit. This operation generates the video signal of object D21 having the resolution equal to or greater than the lower limit in the video signal processing of step S708.

On the other hand, when it is determined that the change in the optical zoom for decreasing the angle of view cannot make the resolution equal to or greater than the lower limit (NO in S720), controller 210 drives driving unit 110 so that an optical axis of projector apparatus 100 approaches the projecting position (S730). After processing of step S730, controller 210 returns to step S700 and performs a sequence of steps again.

For example, when the person to be followed illustrated in FIG. 6D further moves away from projector apparatus 100, it is determined in step S720 that the change in the optical zoom cannot make the resolution equal to or greater than the lower limit (NO in S720). In this case, controller 210 drives driving unit 110 in step S730 as illustrated in FIG. 10, and then performs processing after step S700 again. In projectable area 611' after movement, the resolution of the projection video improves in processing after S700 in which the optical axis of projector apparatus 100 is closer to projecting position 621.

Processing of step S710 and subsequent steps will be described below with reference to FIG. 9. Processing of step S710 and the subsequent steps is performed when it is determined in step S704 that the display area fails to stay within the range of the projectable area, for example, when projection video G22' displayed in the vicinity of the boundary of projectable area 611 is moved across the boundary, as illustrated in FIG. 7A.

In step S710, controller 210 calculates the optical zoom value for increasing the angle of view so that the display area stays within the range of the projectable area. In step S710, controller 210 can calculate the angle of view from the projectable area calculated in step S703. This allows controller 210 to set the optical zoom value.

After calculating the optical zoom value for increasing the angle of view in step S710, controller 210 calculates the resolution of the projection video projected using the calculated optical zoom value (S705A). Next, as in step S706, controller 210 determines whether the resolution calculated in step S705A is equal to or greater than the lower limit (S706A).

When it is determined that the resolution calculated in step S705A is equal to or greater than the lower limit (YES in S706A), controller 210 decides the optical zoom value calculated in step S710 as a determined value, and controls lens driving unit 501 to increase the angle of view (S707A).

Next, controller 210 sequentially performs processing of step S708 and the subsequent steps. For example, when projection video G22' illustrated in FIG. 7A is moved to display area R23 illustrated in FIG. 7D, the angle of view is increased in step S707A, and the video signal processing is performed in image D2' (FIG. 7E) corresponding to projectable area 610 from which display area R23 does not protrude.

In the example of FIG. 7A, based on the optical zoom value calculated in step S710, controller 210 controls zoom lens 510, decreases the optical zoom, and increases the angle of view (5707A). This operation sets projectable area 610 such that display area R23 may not protrude, as illustrated in FIG. 7D.

On the other hand, when it is determined that the resolution calculated in step S705A is not equal to or greater than the lower limit (NO in S706A), controller 210 drives driving unit 110 (S730), and then returns to processing of step S700. That is, in this flow, it is determined that, when the optical zoom value that allows the resolution to become equal to or greater than the lower limit is bigger than the optical zoom value calculated in step S710, control of the optical zoom cannot secure the resolution of the projection video. Here, in step S710, for example, even when the optical zoom value is already the maximum value and a calculable optical zoom value does not allow the display area to stay within the range of the projectable area, controller 210 may control driving unit 110 (S730) and then return to processing of step S700.

Returning to FIG. 8, finally, based on zoom tracking data stored in memory 220, controller 210 determines the focus value and drives focus lens 520 (S709). Controller 210 repeats the above processing in a predetermined cycle.

The aforementioned flow allows projector apparatus 100, even if the size of the projection video is changed and the resolution cannot be secured only by the digital zoom, to maintain the desired resolution in the desired projection size by controlling the optical zoom and performing the subsequent fine tuning by the digital zoom. Therefore, a projection apparatus that is easy to see for a user can be provided.

2-4. Resolution of Projection Video

The resolution of the projection video to be projected by projector apparatus 100 will be described below.

Figure 11A:
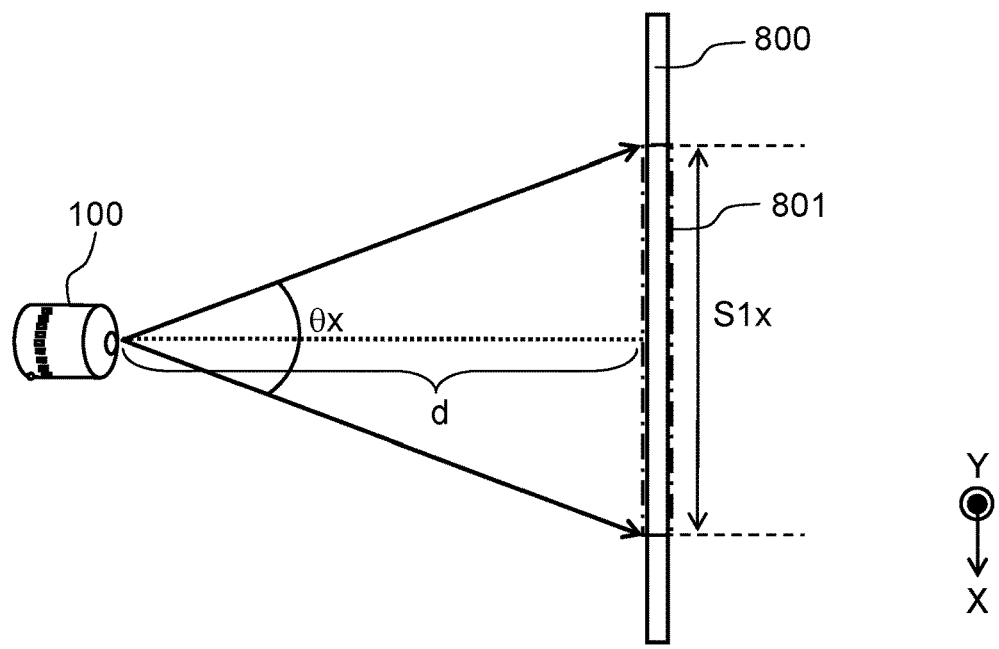
FIG. 11A is a diagram illustrating an example of a projectable area in a case where an image is projected on a projection surface perpendicular to an optical axis of the projector apparatus.

First, a method for calculating the projectable area (step S703 of FIG. 8) will be described with reference to FIG. 11A. FIG. 11A illustrates an example of the projectable area in a case where an image is projected on projection surface 800 perpendicular to the optical axis of projector apparatus 100. In FIG. 11A, the angle of view of projector apparatus 100 in an X direction is θx around the optical axis of projector apparatus 100, and the distance to projection surface 800 is d. In this case, size S1x of projectable area 801 in the X direction is calculated by the following equation.

(Equation 1)

$$S1x = 2 \times d \times \tan(\theta x/2) \quad (1)$$

Size S1y of projectable area 801 in the Y direction is also calculated based on angle of view θy in the Y direction in a similar manner to Equation 1. In step S703 of the flow of FIG. 8, controller 210 calculates projectable area 801 by calculating Equation 1 based on angle of view (θx, θy) and distance d to projection surface 800. Here, angle of view θx in the X direction may be identical to angle of view θy in the Y direction.

Figure 11B:
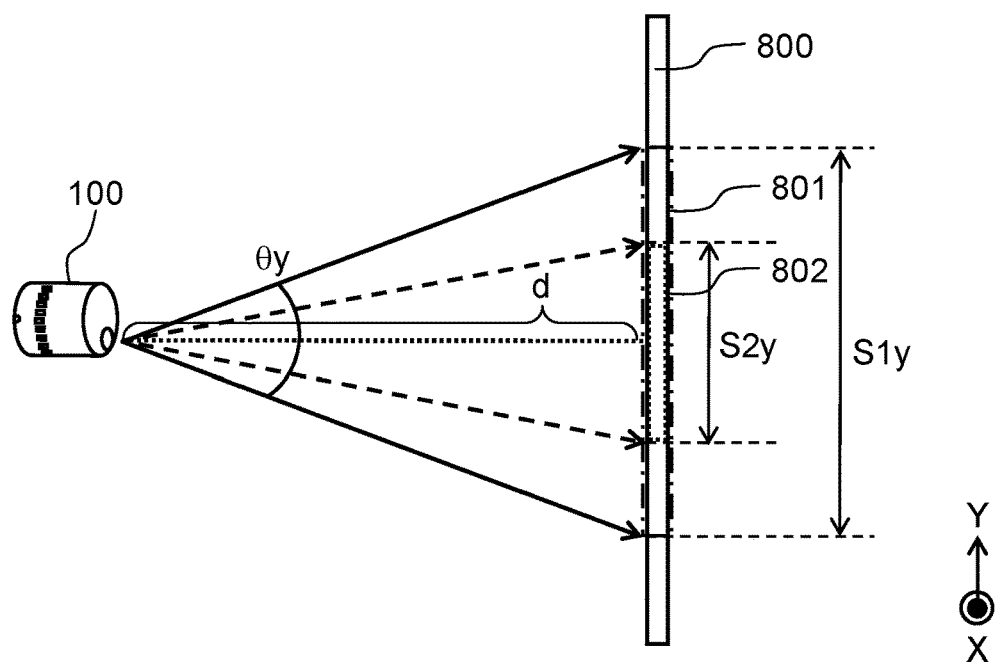
FIG. 11B is a diagram illustrating an example of a display area in the case where an image is projected on the projection surface perpendicular to the optical axis of the projector apparatus.

Next, a method for calculating the resolution of the projection video (step S705 of FIG. 8) will be described with reference to FIG. 11B. FIG. 11B illustrates an example of the display area in the case where an image is projected on projection surface 800 perpendicular to the optical axis of projector apparatus 100. In FIG. 11B, the vertical direction and horizontal direction of projection surface 800 of FIG. 11A are exchanged. The horizontal direction of projection surface 800 (direction from the back side to the front side of the drawing) is the X direction, and the vertical direction of projection surface 800 (direction from the lower side to the upper side of the drawing) is the Y direction.

In FIG. 11B, in the X direction and the Y direction, the resolutions of an image projected on whole projectable area 801 from projector apparatus 100 on projection surface 800 are (P1x, P1y), and the sizes of display area 802 on projection surface 800 are (S2x, S2y), respectively. In this case, on projection surface 800, the resolutions (P2x, P2y) of the projection video that projects the object within the image are determined by a ratio of the size of projectable area 801 to the size of display area 802. Specifically, the resolutions (P2x, P2y) are calculated by the following equation.

(Equation 2)

$$P2x = P1x \times S2x / (2 \times d \times \tan(\theta x/2)) \quad (2x)$$

$$P2y = P1y \times S2y / (2 \times d \times \tan(\theta y/2)) \quad (2y)$$

In step S705 of FIG. 8, controller 210 can calculate the resolutions by Equation 2, without actually generating the video signal for the projection video.

In addition, in the video signal processing of step S708 in FIG. 8, controller 210 can calculate the number of pixels necessary for changing the projection image to a desired projection size by the digital zoom, based on the ratio of the size of projectable area 801 to the size of display area 802, and on a product of the resolutions (P1x, P1y) of the whole image projected by projector apparatus 100 (Equation 2). This allows controller 210, in the video signal processing, to reduce/enlarge the object in an input image to an appropriate projection size.

Figure 12A:
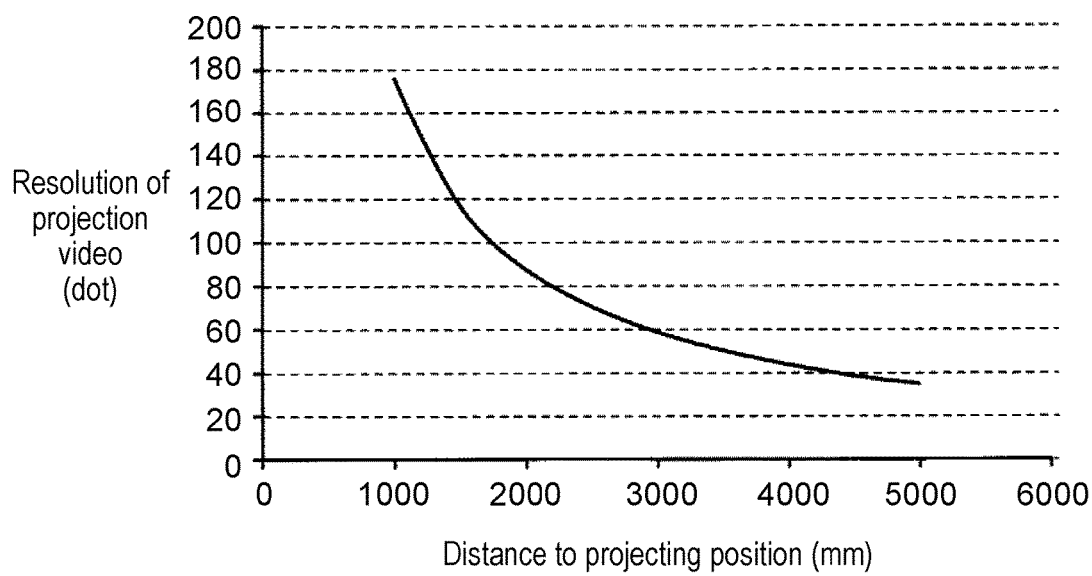
FIG. 12A is a graph illustrating a resolution of projection video in a case where an optical zoom value is fixed and a distance to a projecting position is changed.
Figure 12B:
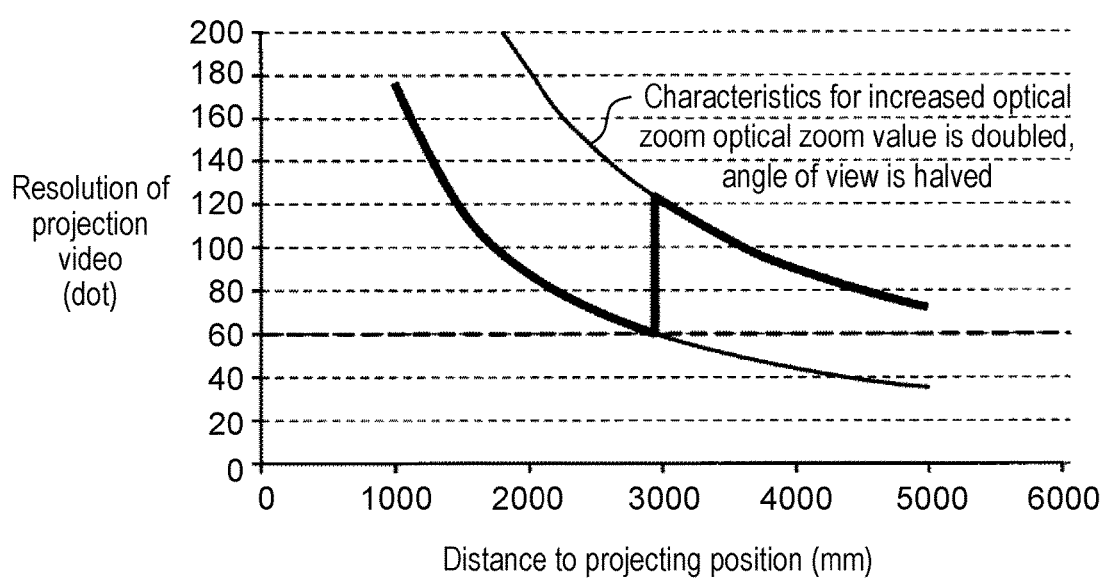
FIG. 12B is a graph illustrating a state in which the optical zoom value is switched so as to secure the resolution of the projection video illustrated in FIG. 12A.

Next, a relationship between the resolution of the projection video and the distance to the projecting position will be described with reference to FIG. 12A and FIG. 12B. FIG. 12A is a graph illustrating the resolution of the projection video in a case where the optical zoom value is fixed and the distance to the projecting position is changed. FIG. 12B is a graph illustrating a state in which the optical zoom value is switched so as to secure the resolution of the projection video illustrated in FIG. 12A. In FIG. 12A and FIG. 12B, the resolution of the projection video is the number of pixels contained in the projection video when the projection size of the projection video is fixed.

FIG. 12A and FIG. 12B illustrate the resolution of the projection video when distance d from projector apparatus 100 illustrated in FIG. 11 is changed. In this case, when the optical zoom value and projection size are constant, the resolution of the projection video is in inverse proportion to distance d to the projecting position, as illustrated in FIG. 12A. In addition, as typical characteristics of a projector apparatus, when the optical zoom value is maintained constant, that is, when the angle of view is maintained constant, the projection size of the projection video increases as the projecting position for projecting the video is farther. In this case, the projection size per pixel increases as the projecting position is farther. Therefore, as digital zoom decreases the size on the image, as illustrated in FIG. 12A, the resolution of the projection video deteriorates.

In contrast, in the present exemplary embodiment, as illustrated in FIG. 12B, control is performed to increase the optical zoom value when the digital zoom decreases the resolution of the projection video excessively. In FIG. 12B, the lower limit of the resolution is 60 dots, and as distance d to the projecting position increases from 1000 mm, the resolution of the projection video coincides with the lower limit at distance d of 3000 mm, and then control is performed to double the optical zoom value. Thus, video signal processing on the image with the decreased projection size per pixel secures the resolution of the projection video.

<3. Advantageous Effects>

As described above, projector apparatus 100 according to the present exemplary embodiment includes projection unit 250 and controller 210. Projection unit 250 projects the projection video of image D1 at the set angle of view on predetermined projection surface 600 in accordance with the video signal that indicates the angle of view of image D1 including predetermined object D20. Controller 210 performs the video signal processing for changing the position or size of object D20 in image D1 to control the position or size of projection video G20 of object D20 on projection surface 600. In a case where the position or size of object D20 in image D1 is to be changed by the video signal processing, when the resolution of the projection video of changed object D20' is less than the predetermined value, controller 210 controls projection unit 250 to decrease the angle of view so that the resolution of the projection video is equal to or greater than the predetermined value. Also, controller 210 sets the size of object D21 in image D1' by the video signal processing.

Projector apparatus 100 according to the present exemplary embodiment can secure image quality of projection video G21 by decreasing the angle of view according to the resolution of projection video G20 and by performing the video signal processing, even when the position or size of projection video G20 is changed.

After the size of object D20' is changed by the video signal processing, when the resolution of the projection video that indicates the object with the changed size is less than the predetermined value, controller 210 may control projection unit 250 to decrease the angle of view. In this case, controller 210 performs the video signal processing so as to set the size of object D21 in the image of the decreased angle of view.

Accordingly, when the size of the projection video changes and the resolution cannot be secured only by the video signal processing, the size of the projection video is set by the video signal processing in the image of the decreased angle of view. This allows the desired resolution to be maintained in desired projection size. Therefore, a projection apparatus that is easy to see for a user can be provided.

Second Exemplary Embodiment

A second exemplary embodiment will be described below with reference to the drawings. In the projector apparatus according to the first exemplary embodiment, user interface device 200 detects movement of a person (standing position of the person) to control movement of projection video. In projector apparatus 100 according to the present exemplary embodiment, user interface device 200 detects a gesture operation to be performed through a touch on a projection surface to control movement of projection video.

Hereinafter, the projector apparatus according to the present exemplary embodiment will be described. Description of a configuration and operation similar to the configuration and operation of the projector apparatus according to the first exemplary embodiment will be omitted as necessary.

Projector apparatus 100 according to the present exemplary embodiment is configured in a similar manner to projector apparatus 100 according to the first exemplary embodiment (refer to FIG. 1 to FIG. 5). A projection operation according to the present exemplary embodiment will be briefly described below with reference to FIG. 13 and FIG. 14. FIG. 13A to FIG. 13F are diagrams for describing the projection operation in response to a reduction operation of the projection video. FIG. 14A to FIG. 14F are diagrams for describing the projection operation in response to a shift operation of the projection video.

Figure 13C:
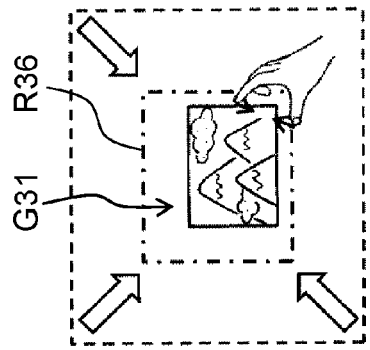
FIG. 13C is a diagram illustrating a display example of the projection operation in response to the reduction operation, subsequent to FIG. 13B.
Figure 13B:
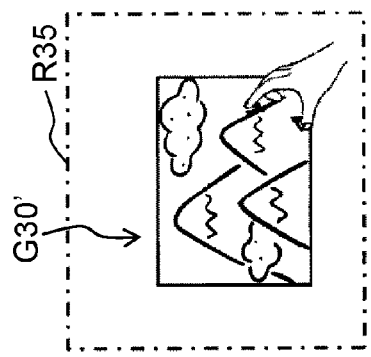
FIG. 13B is a diagram illustrating a display example of the projection operation in response to the reduction operation, subsequent to FIG. 13A.
Figure 13A:
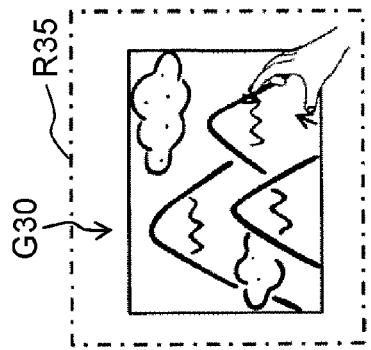
FIG. 13A is a diagram illustrating a display example of a projection operation in response to a reduction operation of a projection size.
Figure 13F:
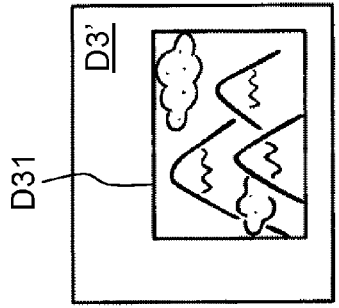
FIG. 13F is a schematic view illustrating an image presented by the video signal processing of FIG. 13C.
Figure 13E:
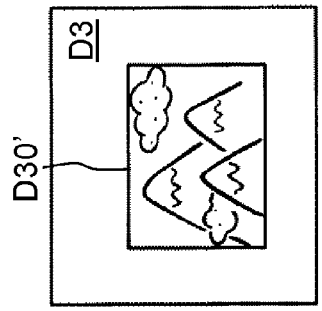
FIG. 13E is a schematic view illustrating an image presented by the video signal processing of FIG. 13B.
Figure 13D:
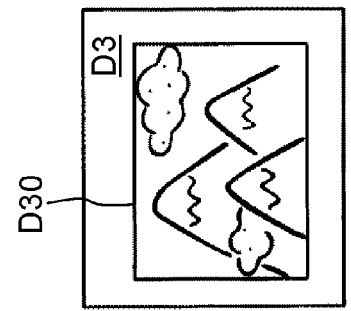
FIG. 13D is a schematic view illustrating an image presented by the video signal processing of FIG. 13A.

FIG. 13A to FIG. 13C illustrate a series of display examples of the projection operation in response to the reduction operation of a projection size. FIG. 13D to FIG. 13F are schematic views illustrating images presented by video signal processing of FIG. 13A to FIG. 13C, respectively. In FIG. 13A, projection video G30 is projected within projectable area R35 corresponding to a predetermined angle of view. As illustrated in FIG. 13A, in response to the gesture operation for narrowing a space between fingers with which the user touches the projection surface, projector apparatus 100 reduces the projection video, as illustrated in FIG. 13B. In this case, without changing an optical zoom, as illustrated in FIG. 13D and FIG. 13E, reducing object D30 within image D3 by a digital zoom allows reduced display of projection video G30 with a good response speed. However, excessive reduction in projection video G30' by the digital zoom leads to excessive reduction in the number of pixels of object D30' within image D3 presented by the video signal processing. Accordingly, a size change made only by the digital zoom cannot secure a resolution of projection video G30'. Therefore, when reduction in the projection video by the digital zoom causes a significant drop in the resolution, control is performed for increasing the optical zoom and decreasing the angle of view, as illustrated in FIG. 13C. In addition, the size of object D31 is increased within image D3' corresponding to projectable area R36 at the decreased angle of view. This allows the resolution of projection video G31 to be secured.

Figure 14F:
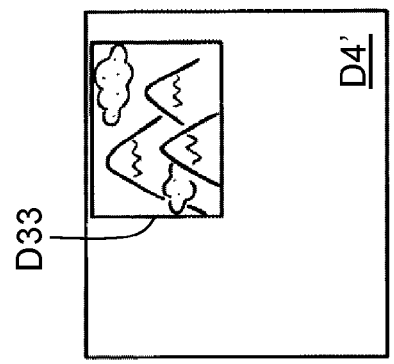
FIG. 14F is a schematic view illustrating an image presented by the video signal processing of FIG. 14C.
Figure 14E:
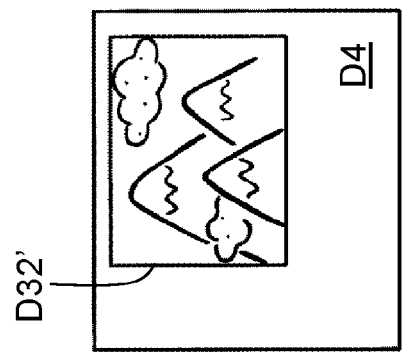
FIG. 14E is a schematic view illustrating an image presented by the video signal processing of FIG. 14B.
Figure 14D:
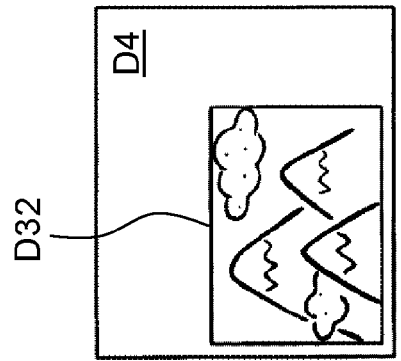
FIG. 14D is a schematic view illustrating an image presented by the video signal processing of FIG. 14A.

FIG. 14A to FIG. 14C are a series of display examples of the projection operation in response to moving operations of a projecting position. FIG. 14D to FIG. 14F are schematic views illustrating images presented by the video signal processing of FIG. 14A to FIG. 14C, respectively. In the display example of FIG. 14A, in response to the gesture operation for shifting a touch position on the projection surface, projector apparatus 100 moves projection video G32 within projectable area R40 (FIG. 14B). In this case, a good response speed is obtained by the digital zoom, without a change in the angle of view. In contrast, when the display of projection video G32' is moved out of projectable area R40 as illustrated in FIG. 14B, by increasing the angle of view through control for reducing the optical zoom to cause display area R33 to stay within projectable area R41 as illustrated in FIG. 14C, projection video G33 of whole object D33 may be displayed.

Figure 15:
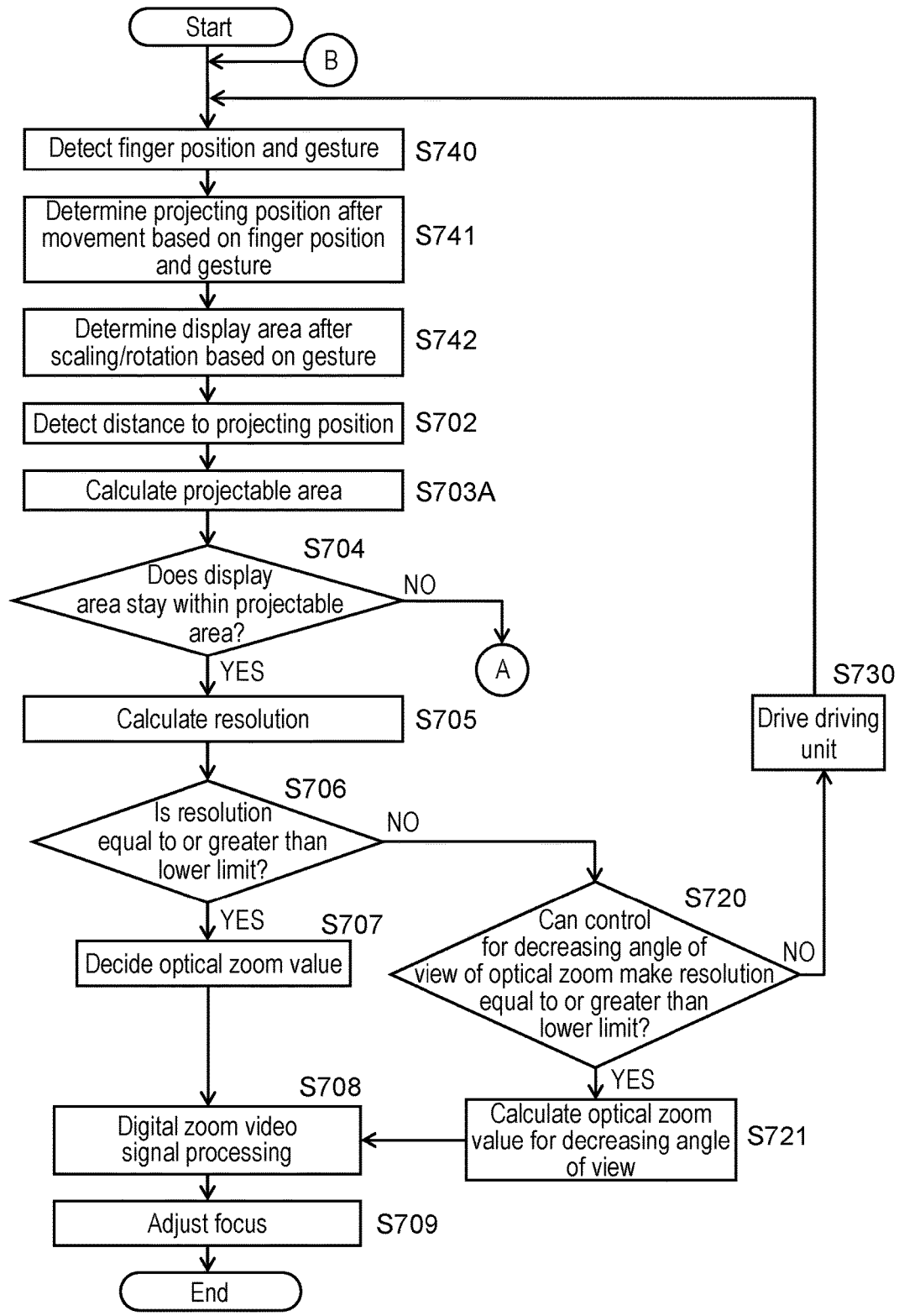
FIG. 15 is a flowchart illustrating a flow of operations of the projector apparatus according to a second exemplary embodiment.

Next, the projection operation of projector apparatus 100 according to the present exemplary embodiment will be described with reference to FIG. 15. FIG. 15 is a flowchart illustrating a flow of operations of projector apparatus 100 according to the present exemplary embodiment. This flow is performed by controller 210 of projector apparatus 100.

In this flow, processing of steps S740 to S742 is performed instead of processing of steps S700 and S701 of the flow illustrated in FIG. 8 to detect the gesture operation made by the fingers of the user in the vicinity of the projection surface.

First, based on distance information from distance detector 230, controller 210 detects a position of the fingers of the user on the projection surface and the gesture in a touch operation (S740). For example, as illustrated in FIG. 13A, controller 210 detects the gesture for narrowing the space between the fingers for instructing reduction of projection video G30.

Next, based on the detected position of the fingers and the gesture, controller 210 determines the projecting position of the projection video after the movement (S741). For example, controller 210 moves the projecting position in accordance with the position of the moving finger as illustrated in FIG. 14A.

Next, based on the detected gesture, controller 210 determines the display area of the projection video after scaling and/or rotation according to instructions of the gesture (S742). For example, in the gesture of narrowing the space between the fingers, controller 210 determines the projection size in accordance with the narrowed space between the fingers. Instead of step S703, controller 210 calculates the projectable area in step S703A. Therefore, in determination processing of step S704, controller 210 uses the display area determined in step S742 and the projectable area calculated in step S703A.

In the present exemplary embodiment, the determination processing of step S704 is performed, for example, as illustrated in FIG. 14A to FIG. 14C, when the gesture operation of the user shifts, rotates, or enlarges the projection video, in order to prevent the display area after movement from protruding from the displayable area.

For example, when projection video G32 illustrated in FIG. 14A is moved to the projecting position illustrated in FIG. 14B, controller 210 determines that the moved display area stays within projectable area R40 (YES in S704). Therefore, without increasing the angle of view, by moving the object (FIG. 14D) corresponding to the projection video of FIG. 14A to the projecting position illustrated in FIG. 14E within image D4 in the video signal processing of step S708, controller 210 displays projection video G32' illustrated in FIG. 14B.

In contrast, when projection video G32' illustrated in FIG. 14B is further moved to the projecting position illustrated in FIG. 14C, controller 210 determines that the moved display area does not stay within projectable area R40 (NO in S704). In this case, the optical zoom value for increasing the angle of view is calculated in step S710, control of the optical zoom enlarges the projectable area (FIG. 14C), and the digital zoom is performed on image D4' corresponding to enlarged projectable area R41 (FIG. 14F).

Also, in the present exemplary embodiment, determination processing of step S706 is performed, for example, as illustrated in FIG. 13A to FIG. 13C, when the projection size of the projection video is reduced in response to the gesture operation, in order to secure image quality in spite of a drop in the resolution of the projection video caused by the digital zoom.

For example, when projection video G30 illustrated in FIG. 13A is reduced to the projection size illustrated in FIG. 13B, controller 210 determines that the resolution of the reduced projection video is equal to or greater than the lower limit (YES in S706). Therefore, without decreasing the angle of view, by reducing object D30 (FIG. 13D) corresponding to projection video G30 of FIG. 13A to the projection size illustrated in FIG. 13E on image D3 in the video signal processing of step S708, controller 210 displays projection video G30' illustrated in FIG. 13B.

On the other hand, when projection video G30' illustrated in FIG. 13B is further reduced to the projection size illustrated in FIG. 13C, controller 210 determines that the resolution of the reduced projection video is less than the lower limit (NO in S706). In this case, the optical zoom value for decreasing the angle of view is calculated in step S720, control of the optical zoom reduces the projectable area (FIG. 13C), and the digital zoom is performed on image D3' corresponding to the reduced projectable area (FIG. 13F).

As described above, even for the gesture operation of the user who touches the projection surface, projector apparatus 100 having the configuration similar to the configuration of the first exemplary embodiment can secure the resolution even when the size of the projection video is changed. Therefore, a projection apparatus that is easy to see for a user can be provided.

Another Exemplary Embodiment

As described above, the first and second exemplary embodiments have been described as examples of the technique disclosed in this application. However, the technique in the present disclosure is not limited to these examples, and may be applied to exemplary embodiments to which change, replacement, addition, and omission have been made as necessary. In addition, it is also possible to make a new exemplary embodiment by combining elements described in the above first exemplary embodiment. Therefore, another exemplary embodiment will be described below.

In the first exemplary embodiment, the person to be followed is detected and the projecting position of the projection video follows the position of the person. An object to be followed which the projection video follows is not limited to a person, but may be, for example, an animal and an automobile. In this case, the distance detector detects the position of a movable body, such as an animal and automobile, and the controller causes the projecting position of the projection video of the object on the projection surface to follow the position of the detected movable body.

In the second exemplary embodiment, distance detector 230 of user interface device 200 detects the gesture operation performed by the user touching the projection surface, to control movement of the projection video. However, the operation of the user to be detected is not limited to this example. For example, instead of the operation of touching the projection video on the projection surface that exists at a far place where the projection surface cannot be touched, the gesture operation of hands or whole body and voice operation may be detected to control movement of the projection video. Also in this case, in a similar manner to the second exemplary embodiment, the resolution can be secured by control of the digital zoom and the optical zoom, and the projection apparatus which is easy to see can be provided.

Although projector apparatus 100 includes distance detector 230 in the aforementioned exemplary embodiments, instead of or in addition to distance detector 230, projector apparatus 100 may include an imaging unit that captures images of visible light (RGB), such as a CCD camera. For example, controller 210 may recognize a person by performing image analysis of the captured image captured by the imaging unit.

In the aforementioned exemplary embodiments, projector apparatus 100 includes driving unit 110 for changing the projection direction. However, the projection apparatus may not include the driving unit. For example, when projector apparatus 100 performs the projection operation only in a predetermined area on the projection surface, projector apparatus 100 can omit the driving unit by setting the projectable area of a maximum angle of view to provide projection on the whole projection surface on which the projection operation is to be performed.

In the aforementioned exemplary embodiments, the number of pixels contained in the projection video is defined as the resolution of the projection video (FIG. 12A, FIG. 12B). Definition of the resolution of the projection video is not limited to this example, and, for example, the resolution of the projection video may be prescribed by the projection size per pixel. The resolution prescribed in this way can represent image quality of the projection video regardless of the projection size when the distance to the projecting position changes. In addition, the resolution of the projection video may be prescribed by the number of pixels contained in each object on the image. In addition, the resolution lower limit of the projection video may be set for each object.

In the aforementioned exemplary embodiments, controller 210 of projector apparatus 100 controls movement of the projection video on the projection surface. The movement of the projection video to be controlled by controller 210 includes not only shift (translation) on the projection surface but also translation, rotation, and combination thereof. Also, instead of or in addition to the movement such as translation and rotation of the projection video of the object, controller 210 may perform enlargement and reduction of the size of the object.

In the aforementioned exemplary embodiments, although projector apparatus 100 projects the projection video on planar projection surface 600, the projection surface is not limited to this example. The projection surface may be an arbitrary surface such as a surface with a curved portion or a surface with unevenness. For example, it is assumed that an uneven shape is formed on a wall surface for projection operations. When geometric correction is performed in accordance with the shape, depending on the shape, the projection size will change in accordance with the projecting position. For example, projection on a wall which is not perpendicular to the optical axis of projector apparatus 100 causes the projection video to be distorted, and the projection size increases as the distance from projector apparatus 100 increases. Although it is necessary to reduce the projection video as the projection size increases, through control of the digital zoom and the optical zoom together in a similar manner to the aforementioned exemplary embodiments, the resolution on the projection surface can be secured.

The aforementioned exemplary embodiments have described increasing the angle of view when the object does not stay within the projectable area by movement of the object. However, even when the object does not stay within the projectable area by enlargement of the object, the object may be controlled to stay within the projectable area through an increase in the angle of view similarly.

As described above, the exemplary embodiments have been described as illustration of the technique in the present disclosure. For this purpose, the accompanying drawings and detailed description have been provided.

Therefore, the components described in the accompanying drawings and detailed description may include not only essential components but also unessential components, in order to illustrate the above-described technique. Therefore, it should not be acknowledged immediately that those unessential components be essential because those unessential components are described in the accompanying drawings and detailed description.

In addition, since the aforementioned exemplary embodiments are intended to illustrate the technique in the present disclosure, various changes, replacements, additions, omissions, etc. may be made within the scope of the appended claims or equivalents thereof.

The projection apparatus according to the present disclosure is applicable to various applications for projecting video on the projection surface.

What is claimed is:

1. A projection apparatus comprising:
   a projection unit that projects an image at a set angle of view on a projection surface in accordance with a video signal indicating the image including a predetermined object, the predetermined object being in the image and being smaller than the image; and
   a controller that performs video signal processing for changing a position or a size of the predetermined object in the image to control the position or the size of the predetermined object on the projection surface,
   wherein, in a case where the position or the size of the predetermined object in the image is to be changed by the video signal processing and when a resolution of the changed predetermined object is less than a predetermined resolution,
      the controller (i) controls the projection unit to decrease the angle of view and (ii) sets the size of the predetermined object in the image by the video signal processing to be equal to or greater than a size of the predetermined object when projected at the predetermined resolution without decreasing the angle of view, and
   wherein in a case where the predetermined object in the image is to be moved by the video signal processing and when the moved predetermined object protrudes from the image,
      the controller (i) controls the projection unit to increase the angle of view so that the moved predetermined object stays within a range of the image and the resolution of the predetermined object is equal to or greater than the predetermined resolution and (ii) moves the predetermined object in the image by the video signal processing.

2. The projection apparatus according to claim 1, further comprising a distance detector that detects distance information indicating a distance between the projection apparatus and the projection surface,
   wherein the controller controls movement of the predetermined object in accordance with the distance information detected by the distance detector.

3. The projection apparatus according to claim 2, wherein the distance detector detects a position of a movable body, and
   the controller causes a projecting position of the predetermined object to follow the detected position of the movable body on the projection surface in accordance with the position of the movable body detected by the distance detector.

4. The projection apparatus according to claim 2, wherein the distance detector detects a gesture of a user, and
   the controller controls the movement of the predetermined object in accordance with the gesture of the user detected by the distance detector.

5. The projection apparatus according to claim 1, further comprising an imaging unit that captures the projection surface,
   wherein the controller controls movement of the predetermined object in accordance with a captured image captured by the imaging unit.

6. A projection apparatus comprising:
   a projection unit that projects an image at a set angle of view on a projection surface in accordance with a video signal indicating the image including a predetermined object, the predetermined object being in the image and being smaller than the image; and
   a controller that performs video signal processing for changing a position or a size of the predetermined object in the image to control the position or the size of the predetermined object on the projection surface,
   wherein, in a case where the position or the size of the predetermined object in the image is to be changed by the video signal processing and when a resolution of the changed predetermined object is less than a predetermined resolution,
      the controller (i) controls the projection unit to decrease the angle of view and (ii) sets the size of the predetermined object in the image by the video signal processing to be equal to or greater than a size of the predetermined object when projected at the predetermined resolution without decreasing the angle of view, and
   wherein, in a case where the size of the predetermined object in the image is to be enlarged by the video signal processing and when the predetermined object with the enlarged size protrudes from the image,
      the controller (i) controls the projection unit to increase the angle of view so that the predetermined object with the enlarged size stays within a range of the image and the resolution of the predetermined object is equal to or greater than the predetermined resolution, and (ii) moves the predetermined object in the image by the video signal processing.

7. The projection apparatus according to claim 6, further comprising a distance detector that detects distance information indicating a distance between the projection apparatus and the projection surface, wherein the controller controls movement of the predetermined object in accordance with the distance information detected by the distance detector.

8. The projection apparatus according to claim 7, wherein the distance detector detects a position of a movable body, and the controller causes a projecting position of the predetermined object to follow the detected position of the movable body on the projection surface in accordance with the position of the movable body detected by the distance detector.

9. The projection apparatus according to claim 7, wherein the distance detector detects a gesture of a user, and the controller controls the movement of the predetermined object in accordance with the gesture of the user detected by the distance detector.

10. The projection apparatus according to claim 6, further comprising an imaging unit that captures the projection surface, wherein the controller controls movement of the predetermined object in accordance with a captured image captured by the imaging unit.

11. A projection apparatus comprising:

a projection unit that projects an image at a set angle of view on a projection surface in accordance with a video signal indicating the image including a predetermined object, the predetermined object being in the image and being smaller than the image; and a controller that performs video signal processing for changing a position or a size of the predetermined object in the image to control the position or the size of the predetermined object on the projection surface, wherein, in a case where the position or the size of the predetermined object in the image is to be changed by the video signal processing and when a resolution of the changed predetermined object is less than a predetermined resolution, the controller (i) controls the projection unit to decrease the angle of view and (ii) sets the size of the predetermined object in the image by the video signal processing to be equal to or greater than a size of the predetermined object when projected at the predetermined resolution without decreasing the angle of view, wherein the projection apparatus further comprises a driving unit that drives the projection apparatus to change a projection direction of the image, and wherein, in a case where the size of the predetermined object in the image is to be changed or the predetermined object in the image is to be moved by the video signal processing, when the resolution of the predetermined object with the changed size or the moved predetermined object is less than the predetermined resolution, and when control of the angle of view fails to make the resolution of the predetermined object equal to or greater than the predetermined resolution, the controller drives the driving unit to change a projecting position of the predetermined object and performs video signal processing.

12. The projection apparatus according to claim 11, further comprising a distance detector that detects distance information indicating a distance between the projection apparatus and the projection surface, wherein the controller controls movement of the predetermined object in accordance with the distance information detected by the distance detector.

13. The projection apparatus according to claim 12, wherein the distance detector detects a position of a movable body, and the controller causes a projecting position of the predetermined object to follow the detected position of the movable body on the projection surface in accordance with the position of the movable body detected by the distance detector.

14. The projection apparatus according to claim 12, wherein the distance detector detects a gesture of a user, and the controller controls the movement of the predetermined object in accordance with the gesture of the user detected by the distance detector.

15. The projection apparatus according to claim 11, further comprising an imaging unit that captures the projection surface, wherein the controller controls movement of the predetermined object in accordance with a captured image captured by the imaging unit.

* * * * *